(12) United States Patent
Apte et al.

(10) Patent No.: US 12,242,774 B2
(45) Date of Patent: Mar. 4, 2025

(54) PREDICTIVE MODELING

(71) Applicant: Dassault Systemes SolidWorks Corporation, Waltham, MA (US)

(72) Inventors: Makarand Apte, Pune (IN); Girish Mule, Pune (IN); Jody Stiles, Northborough, MA (US); Chin-Loo Lama, Bolton, MA (US); Shrikant Savant, Shrewsbury, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 497 days.

(21) Appl. No.: 17/156,780

(22) Filed: Jan. 25, 2021

(65) Prior Publication Data

US 2021/0240881 A1 Aug. 5, 2021

Related U.S. Application Data

(60) Provisional application No. 62/970,317, filed on Feb. 5, 2020.

(51) Int. Cl.
*G06F 30/20* (2020.01)
*G06F 30/12* (2020.01)
*G06F 30/17* (2020.01)
*G06F 111/20* (2020.01)

(52) U.S. Cl.
CPC .............. *G06F 30/17* (2020.01); *G06F 30/12* (2020.01); *G06F 30/20* (2020.01); *G06F 2111/20* (2020.01)

(58) Field of Classification Search
CPC .. G06F 2111/04; G06F 2111/20; G06F 30/12; G06F 30/17; G06F 30/20
See application file for complete search history.

(56) References Cited

U.S. PATENT DOCUMENTS

| 8,818,769 | B2* | 8/2014 | Trainer ................... G06F 30/00 703/1 |
|---|---|---|---|
| 2006/0004841 | A1 | 1/2006 | Heikonnen et al. |
| 2012/0078588 | A1* | 3/2012 | McDaniel ............... G06T 19/20 703/1 |
| 2016/0063174 | A1* | 3/2016 | Rameau .................. G06F 30/00 703/1 |

(Continued)

FOREIGN PATENT DOCUMENTS

| EP | 2333683 | 6/2011 |
|---|---|---|
| EP | 3432172 | 1/2019 |

(Continued)

OTHER PUBLICATIONS

Extended European Search Report for Application No. 21155328.4, dated Jul. 2, 2021.

(Continued)

*Primary Examiner* — Nithya J. Moll
(74) *Attorney, Agent, or Firm* — Sheehan Phinney Bass & Green PA

(57) ABSTRACT

A computer-based method includes enabling a user to create or select a geometric entity in a design in a computer-aided design program, predicting a location and orientation in the design for a copy of the geometric entity, and displaying, as a suggestion to the user, a visual representation of the copy of the geometric entity in the predicted location and orientation in the design.

25 Claims, 23 Drawing Sheets

(56) References Cited

U.S. PATENT DOCUMENTS

| | | | |
|---|---|---|---|
| 2016/0246899 A1 | 8/2016 | Hirschtick | |
| 2018/0122138 A1 | 5/2018 | Piya et al. | |
| 2020/0004894 A1* | 1/2020 | Baran | G06F 30/17 |

FOREIGN PATENT DOCUMENTS

| | | |
|---|---|---|
| JP | 2014099177 | 5/2014 |
| JP | 2014130602 | 7/2014 |
| WO | 2014207454 | 12/2014 |

OTHER PUBLICATIONS

English machine translation of Office Action for JP 2021-015949, dated Nov. 22, 2024.

* cited by examiner

PREDICTIVE MODELING

CROSS-REFERENCE TO RELATED APPLICATION(S)

This application claims the benefit of priority to U.S. Provisional Patent Application No. 62/970,317, entitled Predictive Modeling, which was filed on Feb. 5, 2020. The disclosure of the prior application is incorporated by reference herein in its entirety.

FIELD OF THE INVENTION

This application relates to predictive modeling and, more particularly relates to predictive modeling within the context of a computer-aided design (CAD) program.

BACKGROUND

Computer-aided design (CAD) refers to the use of computers (or workstations) to aid in the creation, modification, analysis, or optimization of a design. CAD software, such as Dassault Systémes (DS) SOLIDWORKS and DS CATIA, can be used to create sketches and/or representations of solid geometries that may be derived from two-dimensional (2D) or three-dimensional (3D) sketches of products being designed.

The sketches and solid geometry can have design requirements where the geometries created need to be replicated in other regions of the component. These other regions often have similar surrounding geometries but are not positioned such that creating a pattern or mirror of the geometry would achieve the desired result requiring the user to manually create very similar geometries in each region. Even for a moderately complex model, this can require the creation of many sketches and downstream features hence it can become a very tedious and time-consuming task. Some techniques do exist to reduce the repetitive nature of these tasks. For example, creating user-defined library features consisting of the many sketches and their downstream features allows for the replication of the geometry in these other regions but require the user to create the library feature for reuse and position in each region.

Improvements in this regard are needed.

SUMMARY OF THE INVENTION

In one aspect, a computer-based method includes enabling a user to create or select a geometric entity in a design in a computer-aided design program, predicting a location and orientation in the design for a copy of the geometric entity, and displaying, as a suggestion to the user, a visual representation of the copy of the geometric entity in the predicted location and orientation in the design.

In another aspect, a computer includes a computer display, a computer processor, and computer-based memory coupled to the computer processor. The computer-based memory stores computer-readable instructions that, when executed by the computer processor, causes the computer processor to perform a process that includes enabling a user to create or select a geometric entity in a design in a computer-aided design program, predict a location and orientation in the design for a copy of the geometric entity, and display on the display device, as a suggestion to the user, a visual representation of the copy of the geometric entity in the predicted location and orientation in the design.

In yet another aspect, a non-transitory, computer-readable medium stores instructions executable by a processor to perform the foregoing steps.

In some implementations, one or more of the following advantages are present.

For example, the systems and techniques disclosed herein helps to reduce the repetitive nature of replicating geometries in other similar regions of a design. This is a common task required to achieve the design intent of a particular component in any computer-based design software. The systems and techniques disclosed herein may help make the task of replicating geometries in similar regions efficient. Moreover, it tries to capture the design intent by considering not just quantitative but also qualitative factors. Thus, with the help of these systems and techniques, design software users can increase their efficiency and improve their productivity many times over compared to the existing solutions. The systems and techniques tend to be very easy to use and intuitive. Moreover, the internal selection of attributes helps capture the design intent of the user in an easy-to-use user-interface. It also reduces the tediousness associated with a common but essential task performed during a design process. Additionally, repetitive tasks done by humans can lead to mistakes. The systems and techniques disclosed herein may help alleviate these types of mistakes.

Other features and advantages will be apparent from the description and drawings, and from the claims.

BRIEF DESCRIPTION OF THE DRAWINGS

Like reference characters refer to like elements.

DETAILED DESCRIPTION

Figure 1:
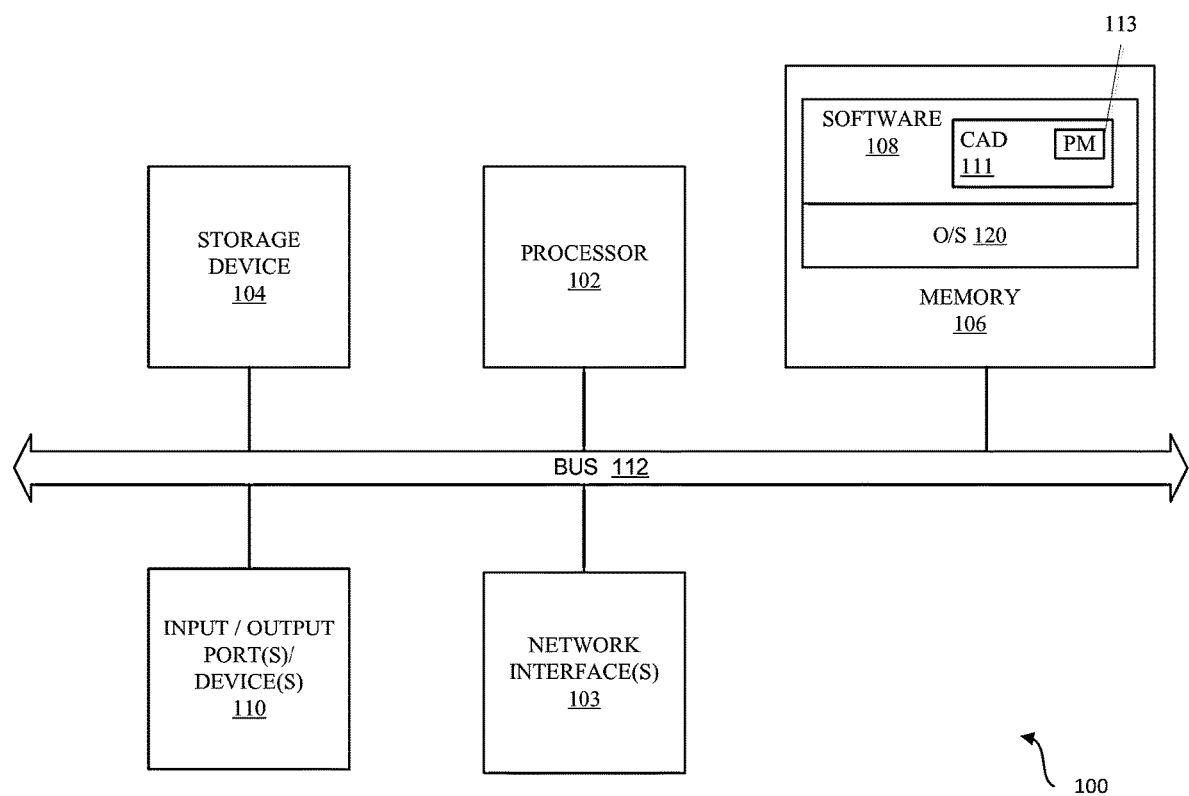
FIG. 1 is a schematic representation of a computer configured to implement predictive modeling.

CAD users sometimes have a need to create multiple versions of the same geometric feature in a design. In some instances, the CAD user creates an original version of the geometric feature and then wishes to create other versions of the same geometric feature in different regions of the design that have the same or similar geometric characteristics as the region of the original version. For example, the CAD user might create a design that includes a solid rectangular cuboid body with a hole extending through the body near one corner of the body. The CAD user might then intend to add three more holes extending through the body—one at each of the other corners of the rectangular cuboid body—each hole being dimensionally identical to the original hole and oriented relative to its respective corner in a similar manner as the original hole. Without the system(s) and technique(s) disclosed herein, the CAD user might need to create and position each hole individually; a tedious and time-consuming process for sure, and one that gives rise to the possibility of user-error in creating and/or positioning the other three holes.

In a typical implementation, the systems and techniques disclosed herein facilitate creating multiple versions of the same geometric feature (e.g., a hole) at different regions in a design (e.g., in multiple corners of a solid rectangular cuboid body) that have either the same or similar geographic characteristics. More specifically, in a typical implementation, when the CAD user creates (or selects) a particular geometric feature in a design (e.g., a hole in a body), the system automatically predicts where else in the design the user might want to place the same geometric feature and how the user might want to orient that geometric feature. The system presents this information to the CAD user as suggestions and the CAD user can accept or reject some or all of the suggestions.

In a typical implementation, the predictions are made by comparing the geometric characteristics of the region where the original geometric feature is created to geometric characteristics of other regions in the design.

The system may present its predictions/suggestions to the user on screen as part of the design itself—typically, in a manner that visually distinguishes the suggested predictions from other geometric entities in the design. Typically, the system generates the predictions so that each one is, aside from its location and, perhaps orientation, in the design, identical to the original, user-created geometric entity.

Any predictions that the CAD user accepts automatically become geometric features in the design.

In a typical implementation, these system(s) and technique(s) help to automate, accelerate and simplify the creation of designs, including very complex designs, in a CAD system. With the help of these system(s) and technique(s), CAD users can increase their efficiency, reduce the occurrence of errors, and improve productivity many times over compared to other systems. The system(s) and techniques(s) are very easy to use. Moreover, they can, in many instances, help capture the design intent of the user via an easy-to-use user-interface. The system(s) and technique(s) also reduce the tediousness associated with a common task of the design process, i.e., creating multiple versions of the same geometric feature in different but similar regions in the design. Because the predictions are usually generated automatically to be dimensionally identical to the original user-created geometric entity, the systems and techniques disclosed herein can remove or at least reduce the possibility of user-error in creating and locating multiple versions of the same geometric entity at different, geometrically similar locations throughout a design.

FIG. 1 is a schematic representation of an example of a computer (or system) 100 that can, alone or in combination with other computers or computer components (e.g., servers or the like), perform and/or facilitate the computer-based functionalities disclosed herein.

In a typical implementation, the computer 100 is configured to provide functionalities in connection with computer-aided design (CAD) software. More specifically, the computer 100 is configured to provide functionalities that enable CAD users to quickly and easily duplicate certain geometric entities in a design to multiple different locations in the design that tend to make sense in the context of the design. At a high level, the computer provides this functionality by predicting, for each geometric entity that the CAD user creates (or selects), whether there are other places in the design where the user is likely to want to add a copy of that geometric entity, and how any such copies might be oriented in the design. The computer 100 typically presents its predictions as a dynamic preview within the design and provides the CAD user with a wide variety of options to quickly and easily accept, modify, and/or reject any or all of the predictions made by the computer.

In a typical implementation, the computer 100 makes its predictions by calculating (identifying) local coordinate systems and descriptors associated with all, or at least several of, the co-vertices in the modeled object of the design. The computer 100 uses the descriptors to identify co-vertices that have similar surrounding characteristics and uses the local coordinate systems to position any duplicates (or copies) of geometric entities in locations and orientations that make sense, intuitively.

In a typical implementation, the computer 100, and the computer functionalities disclosed herein, helps CAD software users increase their efficiency and improve their productivity many times over compared to the existing technologies. Moreover, the functionalities, in a typical implementation, are easy to use, help capture the design intent of the user, and are accessible through an easy-to-use user-interface. The functionalities also typically reduce the tediousness associated with a common but essential task performed during a design process—creating multiple copies of the same (or a similar) geometric feature in a design.

The computer 100 has a system bus 112 (i.e., a set of hardware lines used for transferring data among the components of the computer 100). The system bus 112 is essentially a shared conduit that connects different elements of the computer (e.g., processor 112, storage device 104, memory 106, input/output port(s) 110, network interface port(s) 103, etc.) and enables information transfer between the connected elements. Attached to the system bus 112 is one or more I/O ports/devices 110 that include or are for connecting various input and/or output devices (e.g., keyboards, mouse, displays (touch sensitive or otherwise), printers, speakers, microphones, etc.) to the computer 100. One or more network interfaces 103 allow the computer 100 to connect to and interact with various other devices (e.g., other computers, servers, memory storage devices, etc.) coupled to the computer 100 over a network. Memory 106 is essentially a computer-readable medium that stores computer-readable instructions. Memory may include virtually any kind of computer-based memory including both/either volatile and/or non-volatile computer memory. In a typical implementation, memory 106 stores computer software that includes computer-readable instructions that, when executed by the processor 102 cause the processor 102 to perform processes explicitly disclosed herein and other processes to support various other functionalities attributable to the computer 100 and disclosed herein. The software, in the illustrated implementation, includes computer-aided design (CAD) software 111, with a predictive modeling (PM) module 113 that includes instructions that enables the processor 102 and computer 100 to perform and/or facilitate/cause the various functionalities disclosed herein. Memory 106 also stores an operating system 120 to support the various functionalities disclosed herein. The processor 102 is attached to the system bus 112 and provides computer-based processing functionalities. The components of the illustrated computer 100 can be local (e.g., within one common housing or at a single workstation) or distributed (e.g., at multiple locations across a network).

Figure 2:
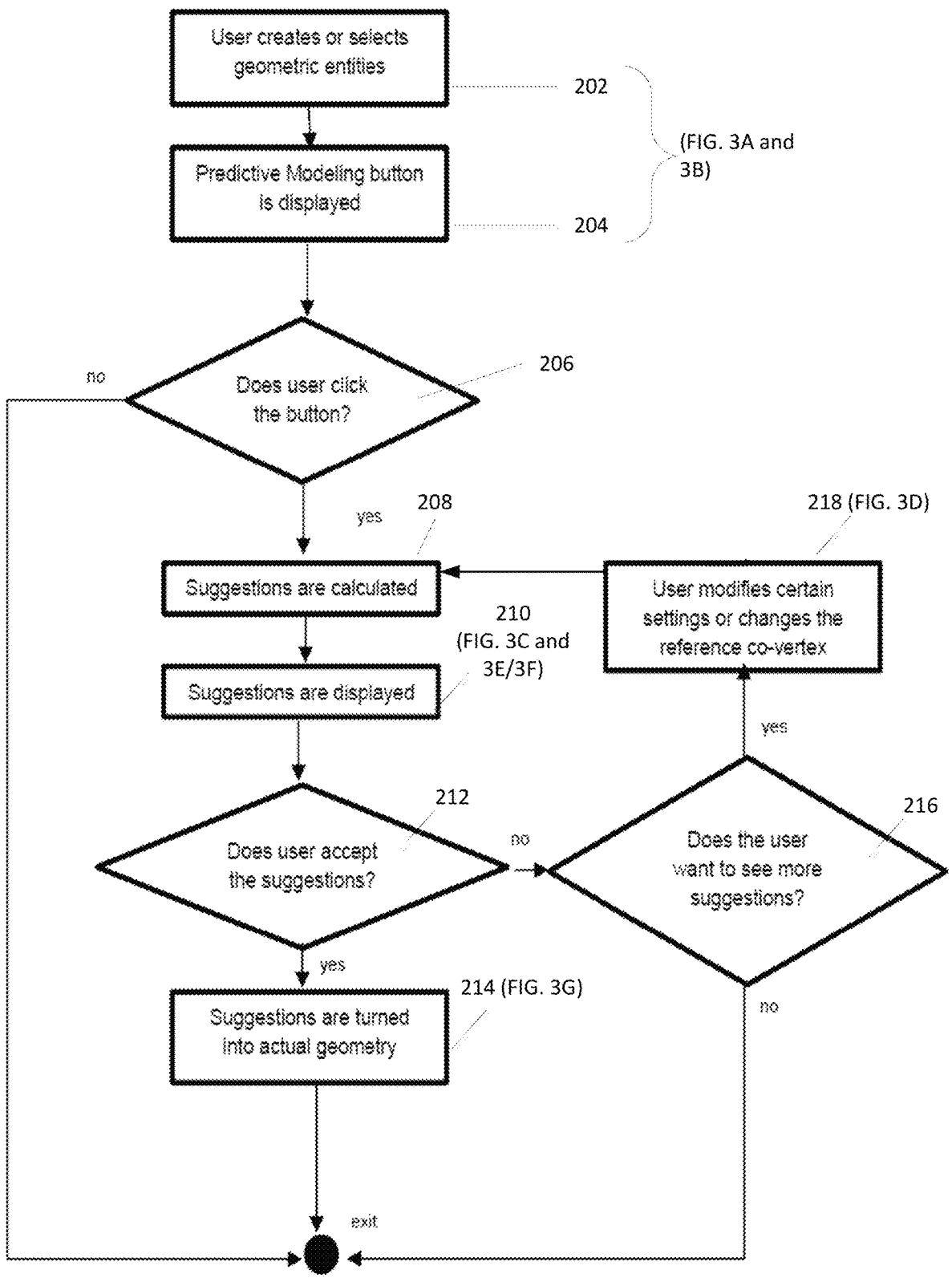
FIG. 2 is a flowchart representing a predictive modeling process.

FIG. 2 is a flowchart that represents an exemplary user interaction with the computer 100 of FIG. 1. FIGS. 3A-3G are partial screenshots of a display (i.e., one of the I/O devices 110 in the computer 100 of FIG. 1) showing a design (modeled object) at various stages of being created/modified in the graphics area of a CAD software program in system 100. Unless otherwise indicated, the word "design" and the phrase "modeled object" are used largely interchangeably herein. Each screenshot in FIGS. 3A-3G corresponds to a corresponding step in the FIG. 2 flowchart.

Figure 7:
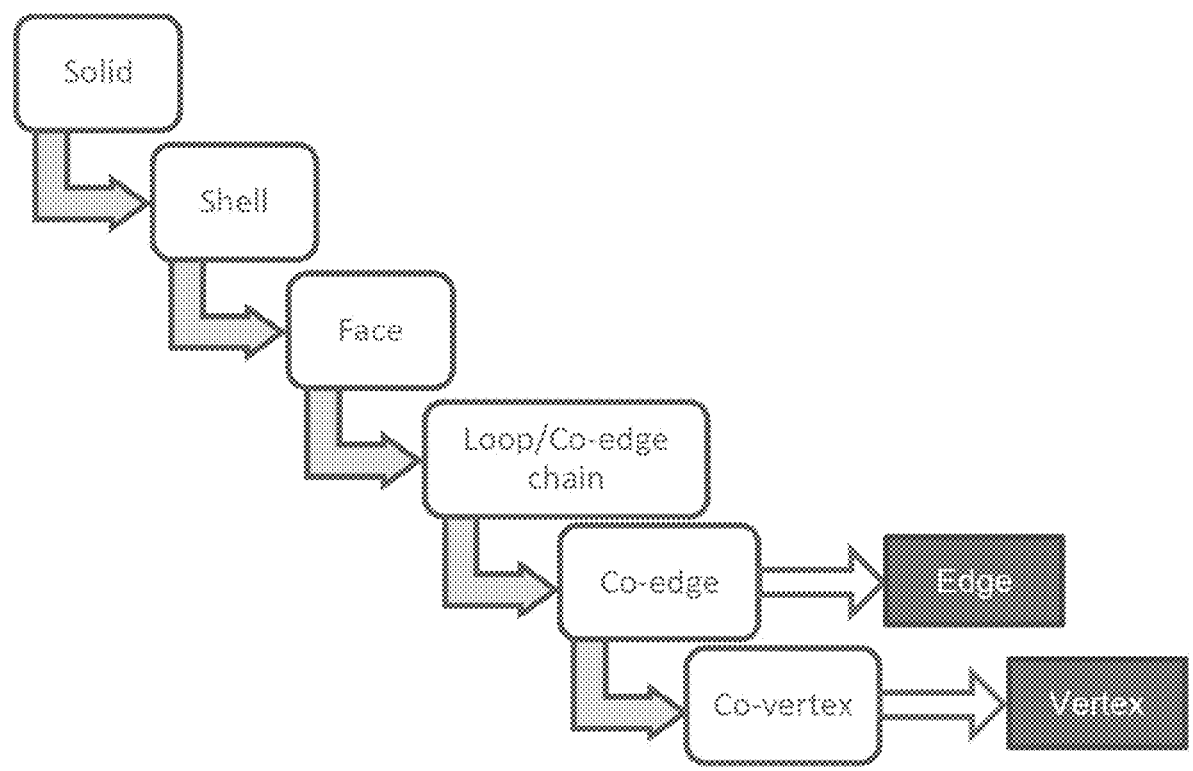
FIG. 7 is a schematic representation of an exemplary hierarchical relationship between the different topological elements in a boundary representation of a modeled object.

First, a few words on terminology are warranted. Boundary Representation, or B-Rep, is used to represent a modeled object by most modern CAD programs. In this representation, a modeled object is represented by a hierarchical relationship between different topological elements, namely solids, shells, faces, co-edge chains, co-edges, edges, co-vertices and vertices. FIG. 7 is a schematic representation of an exemplary hierarchical relationship between the different topological elements in a boundary representation of a modeled object. According to the illustrated implementation, a solid is represented by its bounding shells, a shell is represented by a set of connected face, a face is represented by its bounding co-edge chains, and a co-edge chain is represented by an ordered list of co-edges that are connected by co-vertices. A co-edge chain may be closed, that is, it may loop back on itself, when used in the context of bounded geometry. A co-edge chain may be open when used in the context of a sketch. A co-edge chain may belong to a face called as its parent face. A co-edge chain inside a sketch may exist without a parent face. Moreover, according to the illustrated implementation, a co-edge is the representation of an edge in the context of a particular co-edge chain. The orientation the co-edge can differ from the orientation the edge. A co-edge is bounded by two co-vertices, a start co-vertex and an end co-vertex. The choice of which co-vertex is considered as start co-vertex and which is considered as the end co-vertex may be determined by which one occurs first in an ordered chain of the co-edges. A co-edge always belongs to a single co-edge chain, which may be referred to as its parent co-edge chain. According to the illustrated implementation, an edge is described by the curve/line where two faces meet. The number of co-edges referring to every edge is equal to the number of co-edge chains that edge participates in. In sketches, an edge may have one or more co-edges. In manifold solids, every edge has two co-edges. In sheet models, an edge may have only one co-edge. In non-manifold solids, an edge may have more than two co-edges. Moreover, according to the illustrated implementation, a co-vertex is the representation of a vertex in the context of a particular co-edge chain. A co-vertex acts as the end co-vertex of its previous co-edge and as the start co-vertex of its next co-edge. A co-vertex always belongs to a single co-edge chain called as its parent co-edge chain. A vertex may be described by the point where two or more edges meet. The number of co-vertices referring to every vertex is generally equal to the number of co-edge chains that the vertex participates in. A reference co-vertex is the co-vertex that indicates the context of the surrounding region to be considered for calculating the predictions/suggestions.

Additional commentary on the foregoing and other related terminology is provided below, under the "Terminology and Related Concepts" section header.

Referring now to the flowchart in FIG. 2, a user (at 202) creates or selects one or more geometric entities in a design.

Figure 3A:
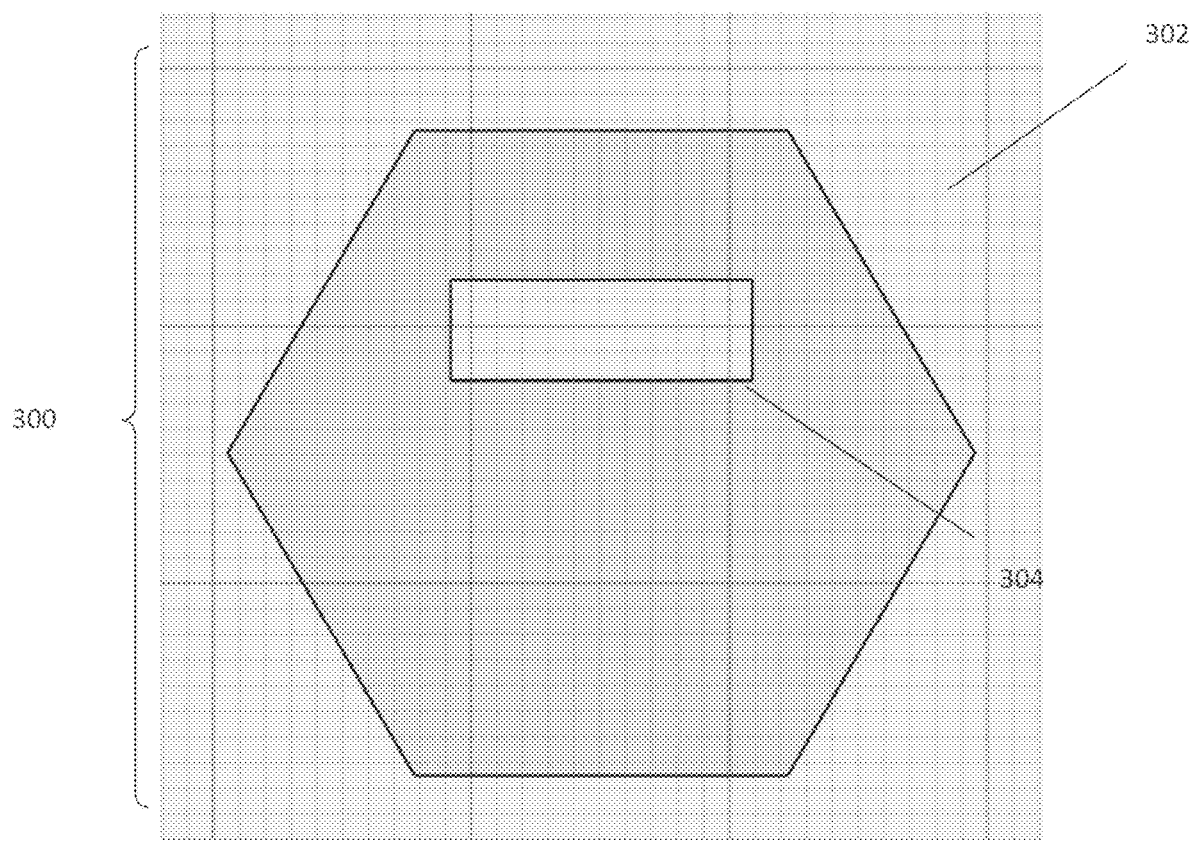
FIGS. 3A-3G show a sequence of partial screenshots that represent one example of predictive modeling in accordance with the flowchart of FIG. 2.

FIG. 3A is a partial screenshot that shows a base geometry 300 that has been drawn by a CAD user in the graphics region of a CAD software program. The base geometry 300 includes a hexagon 302 with a rectangular cut out 304 in an upper region of the hexagon 302.

Figure 3B:
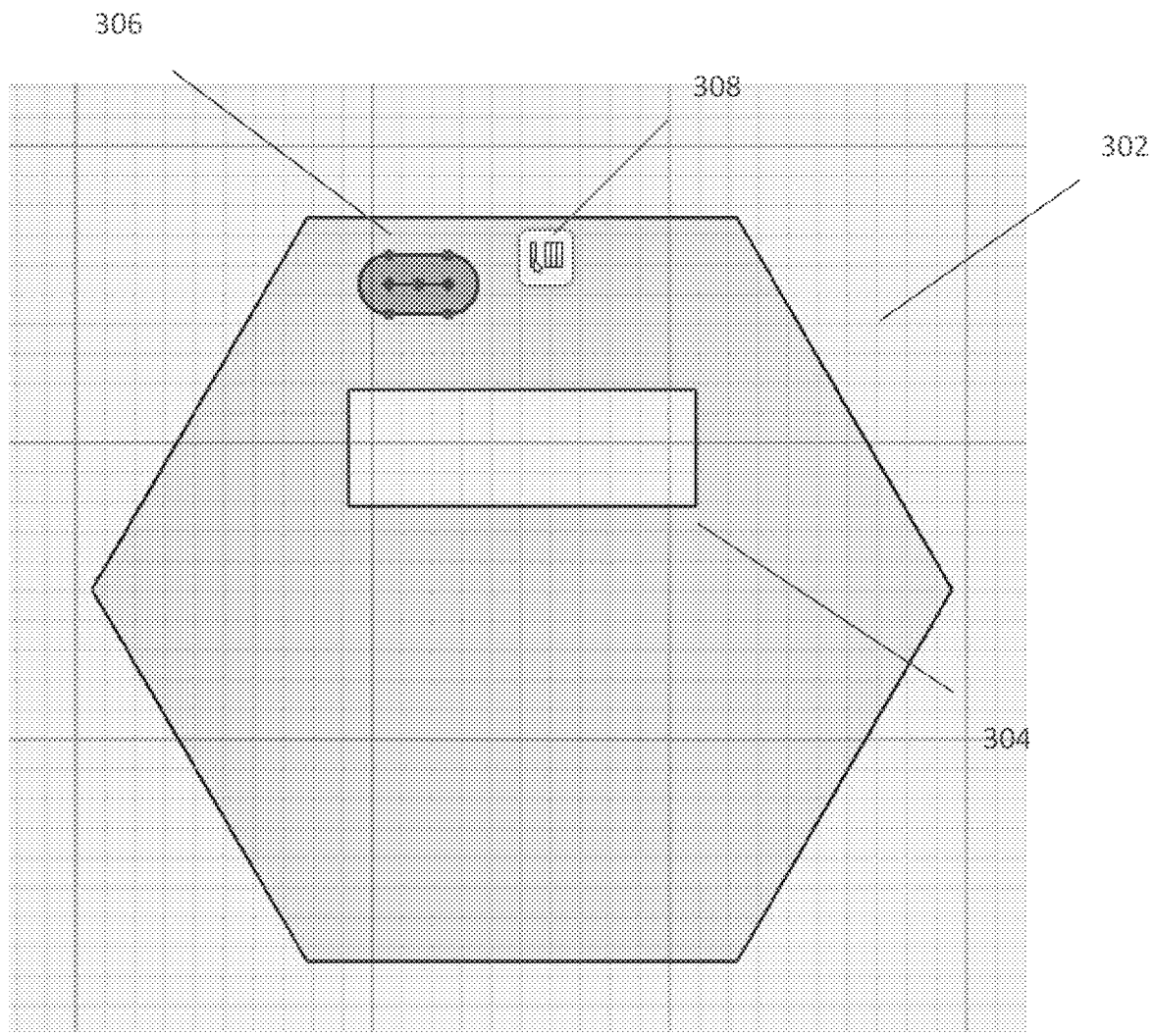

FIG. 3B is another partial screenshot that again shows the hexagon 302 from FIG. 3A. However, in the screenshot of FIG. 3B, the CAD user has just created a new geometric feature—an obround 306 inside the hexagon 302—in the design. The obround 306 is in the upper left region of the hexagon 302, above the rectangular cut out 304, and oriented so that its straight parallel sides lie in planes that are parallel to the upper and lower edges of the hexagon 302.

Next, according to the FIG. 2 flowchart, the computer (at 204) displays onscreen a user-selectable predictive modeling (PM) button. In a typical implementation, this is done automatically and in direct response to the CAD user having created a new geometric entity (e.g., obround 306) in the design. An example of this kind of user-selectable PM button 308 is shown in the screenshot of FIG. 3B to the right of the newly-created geometric feature (i.e., obround 306). The PM button 308, essentially, acts as an indicator or reminder to the CAD user that the system is capable of predicting (and suggesting to the CAD user) where else in the design the CAD user might want to add identical instances of the geometric feature just created and how those instances might be oriented in the design.

At this point (i.e., when the system merely presents the user-selectable PM button 308 on the screen, as shown in FIG. 3B), the computer 100 does not provide any substantive information to the user about what its predictions might be. It is merely indicating to the user that such predictions could be made available, and that the user has the option of accessing/seeing those predictions by selecting the user-selectable PM button 308. The computer 100 only provides substantive information about the predictions if and when the user selects the user-selectable PM button 308.

Referring again to the FIG. 2 flowchart, unless the user clicks (selects) the PM button (at 206), the computer 100 simply waits for the user to create another geometric entity in the design, at which point, the computer 100 presents another user-selectable PM button onscreen near the new geometric entity. However, if the user clicks (selects) the PM button 308 (at 206), the computer 100 calculates predictions/suggestions (at 208) and displays those predictions/suggestions to the user onscreen (at 210).

Figure 3C:
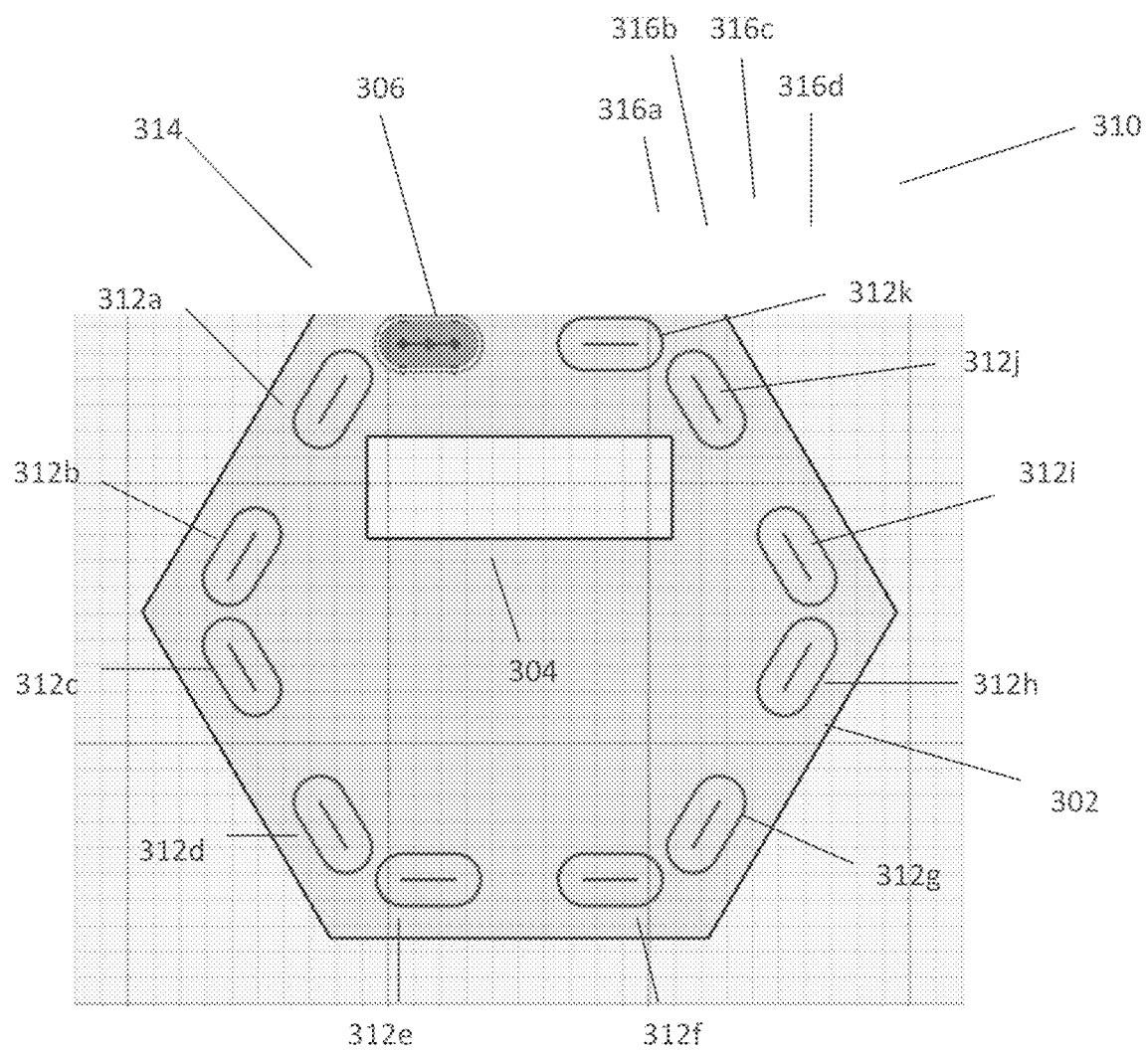

FIG. 3C shows an example of a screenshot that the computer 100 might display in response to the user selecting the PM button 308. The illustrated screenshot includes in the graphics area of the CAD program, and on the design itself, a visual representation of the system's predictions/suggestions to show how copies of the geometric entity can be added, located, and oriented elsewhere in the modeled object. The illustrated example includes eleven suggestions 312A-312k—all obrounds—referred to herein collectively as suggestions 312. Each suggestion 312 is a version of, and identical in size and shape to, the last geometric entity (i.e., the obround 306) created by the user. The location of every suggestion 312 has some similarity to the location of the last created geometric entity 306.

The suggestions 312 as shown in FIG. 3C are not yet part of the design being created. Instead, the suggestions 312 shown in FIG. 3C are mere visual representations of system suggestions/predictions. In a typical implementation, the suggestions 312 appear on the screen, at this point in the process, in a manner that makes them easily distinguishable visually from the most recent user-created geometric feature 306, which is a part of the design at this point. There are a variety of ways this visual distinctiveness can be expressed.

For example, in the FIG. 3C screenshot, the most recent user-created geometric feature 306 appears darker than the predictions/suggestions 312. In various other implementations, the suggestions 312 may appear on the screen as a different color than the user-created geometric feature 306, or the suggestions 312 may be drawn with dashed or dotted lines, while the user-created geometric feature 306 may be drawn with solid lines (or vice versa). Several of these and/or other measures may be implemented to visually distinguish the suggestions 312 from the most recently created geometric entity 306 that served as a seed for the predictions calculations.

When the computer 100 (at 208) calculates the predictions/suggestions, the computer 100 identifies one of the co-vertices in the design as a reference co-vertex. In some implementations, the computer 100, by default, will select the co-vertex that is physically closest to the most recently created, or selected, geometric entity 306 as the reference co-vertex. The computer 100 then looks for other co-vertices in the design that are matches (i.e., that are in regions that are similar to the region of the reference co-vertex). The computer 100 typically presents its predictions/suggestions 312 on the design nearby the other co-vertices that the computer 100 has identified as matches. The system orients each prediction/suggestion relative to its associated co-vertex just like the most recently created geometric entity 306 is oriented relative to the reference co-vertex. In some instances, the computer 100 will provide a prediction/suggestion 312 near every one of the co-vertices it identifies as matching the reference co-vertex.

In a typical implementation, therefore, the predictions/suggestions 312 that the computer 100 provides depends, at least in part, on which co-vertex in the design the computer 100 uses to make (calculate) those predictions/suggestions 312. Moreover, the predictions/suggestions 312 may of course be different if the computer uses one co-vertex versus another co-vertex as the reference co-vertex. For this reason, the computer 100 generally informs the user for a particular set of predictions/suggestions which co-vertex in the design the computer 100 used as the reference co-vertex and enables the user to designate a different co-vertex for the computer 100 to use in updating/making new predictions/suggestions. There are a variety of ways that the computer 100 could perform this functionality. In the screenshot of FIG. 3C, for example, the reference co-vertex is identified by an orb 314—at the intersection between the top edge of the hexagon 302 and the left, upper, side edge of the hexagon 302—that the user can drag and drop to another co-vertex in the modeled object, which causes the computer 100 to automatically update its predictions/suggestions using the new co-vertex as its reference point (i.e., the reference co-vertex).

The screenshot of FIG. 3C also has a suggestions context menu 310 that took the place of the user-selectable PM button 308. The suggestions context menu 310 has four user-selectable icons 316a-316d, each of which can be selected to invoke or access one or more computer functionalities. Icon 316a is a drop point icon, the selection of which causes the computer to show all valid drop points in a design simultaneously. Icon 316b is a settings icon, the selection of which causes the computer 100 to present an interface onscreen with various system settings relevant the suggestions functionalities. Icon 316c is an accept icon, the selection of which indicates to the computer 100 that the user wants to accept any onscreen, active predictions/suggestions. Such a selection causes the computer 100 to incorporate any onscreen, active predictions/suggestions as geometrical entities into the design. Icon 316d is a close icon, the selection of which causes the computer 100 to close the suggestions context menu 110 and to remove any predictions/suggestions that the user has not already accepted from the design.

These user-selectable icons 316a-316d can take on any one of a variety of possible visual appearances. In the illustrated implementation, the first user-selectable icon 316a appears as a polygon with smaller circles at three of its four corners and a larger circle near its fourth corner; the second user-selectable icon 316b appears as a gear, which is a symbol commonly recognized as being associated with computer settings; the third user-selectable icon 316c appears as a checkmark in front of a rectangle; and the fourth user-selectable icon 316d appears as the letter x.

The screenshot in FIG. 3C enables the user to review and consider the computer's predictions/suggestions 312 before accepting, rejecting, or modifying them. Referring again to the flowchart FIG. 2, if the user (at 212) accepts the predictions/suggestions provided by the computer 100, then the computer 100 (at 214) turns the accepted predictions/suggestions into actual geometries (i.e., geometric entities) in the design. If that happens, the accepted predications/suggestions cease to be predictions/suggestions and become part of the design itself.

If the user (at 212) does not accept the predictions/suggestions provided by the computer 100, but the user (at 216) wants to see other predictions/suggestions from the computer 100, then the computer 100 enables the user to make certain modifications (at 218) that may prompt the computer 100 to calculate and provide new predictions/suggestions. Once the modifications are made (at 218), the computer 100 (at 208) calculates the new predictions/suggestions and (at 210) displays the new predictions/suggestions to the user.

There are a variety of ways in which the computer 100 might enable the user to prompt the computer 100 to calculate and provide new predictions/suggestions. These include enabling the user to: a) toggle a "similarity" option on or off in the settings interface, b) toggle a "symmetry" option on or off in the settings interface, c) toggle one or more of the predictions/suggestions being displayed on or off by tapping directly on the prediction/suggestion (when a particular one of the predictions/suggestions has been toggled off, the toggled off suggestion may appear desaturated), d) choose another reference co-vertex (e.g., by dragging the orb 114 to another location), and/or e) turn a "propagate suggestions across components" option on or off (turning this option on generally indicates to the computer 100 to look for similar regions in not just the current base solid, but also in all other solids that may have been opened in the current session. In various implementations, the computer 100 might provide one or more other ways for the user to prompt the computer 100 to calculate and provide new predictions/suggestions.

Figure 3D:
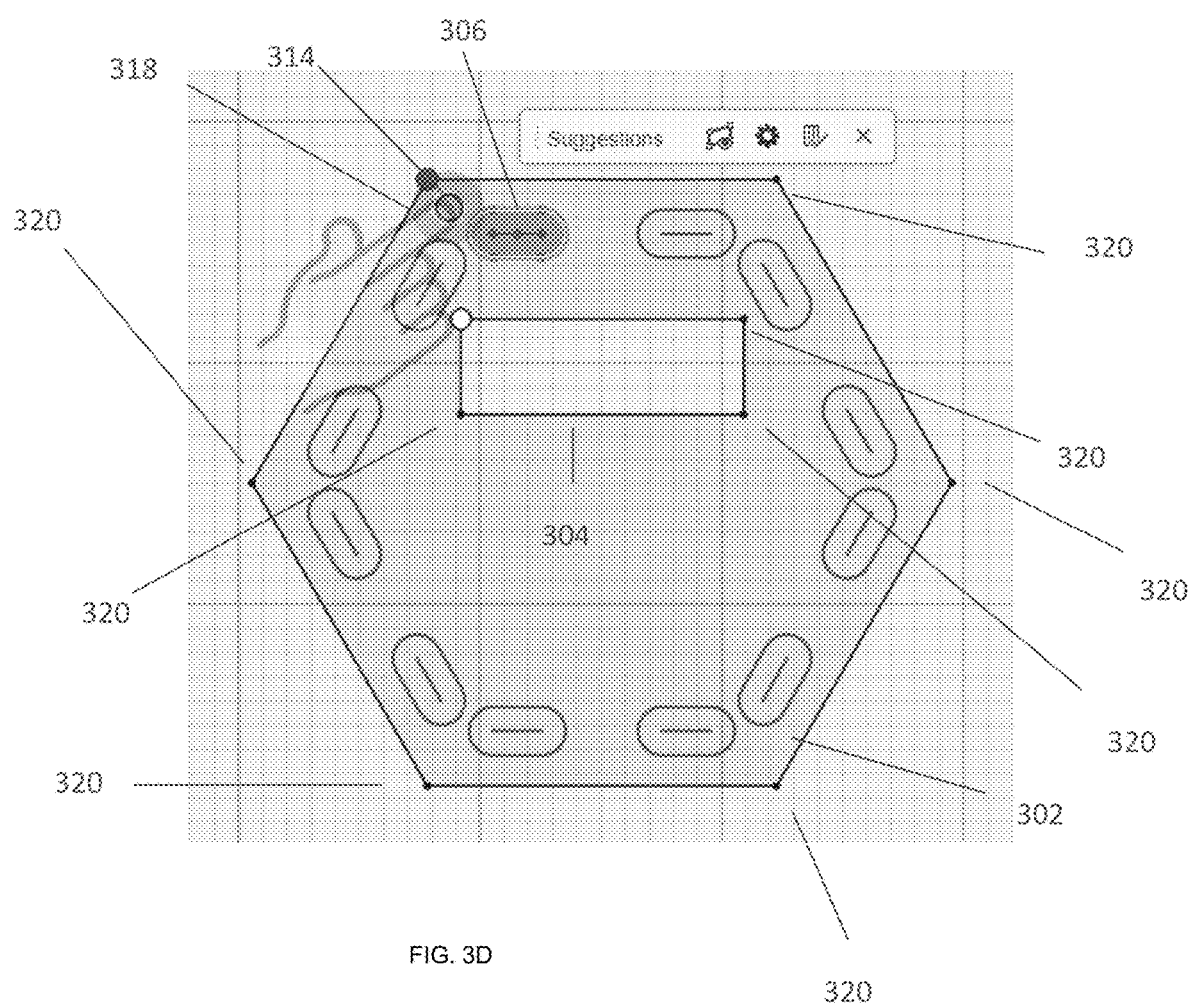

FIG. 3D is a schematic representation showing a user dragging the orb 314 from its original position identifying the original reference co-vertex for the predictions/suggestions to a new location. More specifically, FIG. 3D shows a user's finger 318 touching the screen and in the process of dragging the orb 314 from its original location—on the original reference co-vertex (at the intersection of the top edge and the upper, left, side edge of the hexagon 302)—to a new location. If the user, in FIG. 3D, drops the orb 314 at a location (e.g., a "drop point" or "drop target") that corresponds to a different co-vertex than the original reference co-vertex and thereby designates the different co-vertex as a new reference co-vertex, the computer will calculate new predictions/suggestions (at 208) and display those new predictions/suggestions (at 210). The new predictions/suggestions are calculated using the new reference co-vertex.

In a typical implementation, once the user starts to drag the orb 314 and throughout the dragging process, the system identifies all of the co-vertices in the design onscreen. This may be accomplished in any number of ways. In one implementation, this is accomplished by applying markings—black dots, for example—on the co-vertices of the modeled object. In the implementation of FIG. 3D, for example, co-vertices are identified by black dots 320.

Moreover, in a typical implementation, once the user starts to drag the orb 314 the computer 100 identifies on screen certain all co-vertices in the design that may be viable alternatives to the original reference co-vertex. These viable alternative co-vertices are potential drop points for the orb 314 that the user is dragging. In some implementations, the computer considers a co-vertex as a viable alternative to the original reference co-vertex only if it offers one or more new (different) suggestions compared to those offered by the original reference co-vertex. Further, if the suggestions offered by a certain set of viable co-vertices are exactly same (even though they may be different from the suggestions offered by the original reference co-vertex), then the computer may consider only one of the co-vertices from that set as viable—typically, the one that is nearest from the seed geometry.

Typically, when the dragging process begins, the computer 100 identifies these certain viable alternative co-vertices onscreen. There are a variety of ways the computer 100 might accomplish this. For example, according to the implementation in FIG. 3D, when the dragging process begins, the computer 100 identifies viable alternative co-vertices with markings that resembles empty circles 312 (e.g., that may be white with a gray outline) on the screen itself.

When the dragging process begins, the computer 100 may change the appearance of the reference co-vertex. In one exemplary implementation, the reference co-vertex may be marked with an empty white circle before the dragging process begins (see FIG. 3C), but that marking may change into a darkened (e.g., brown) circle after the dragging has begun (see FIG. 3D). The brown circle indicates that, although the orb 314 is being dragged and the reference co-vertex may change, the suggestions (e.g., 312a-312k in FIG. 3C) that appear on the screen were determined by the computer 100 using the co-vertex marked by the brown circle as a reference co-vertex.

Figure 3E:
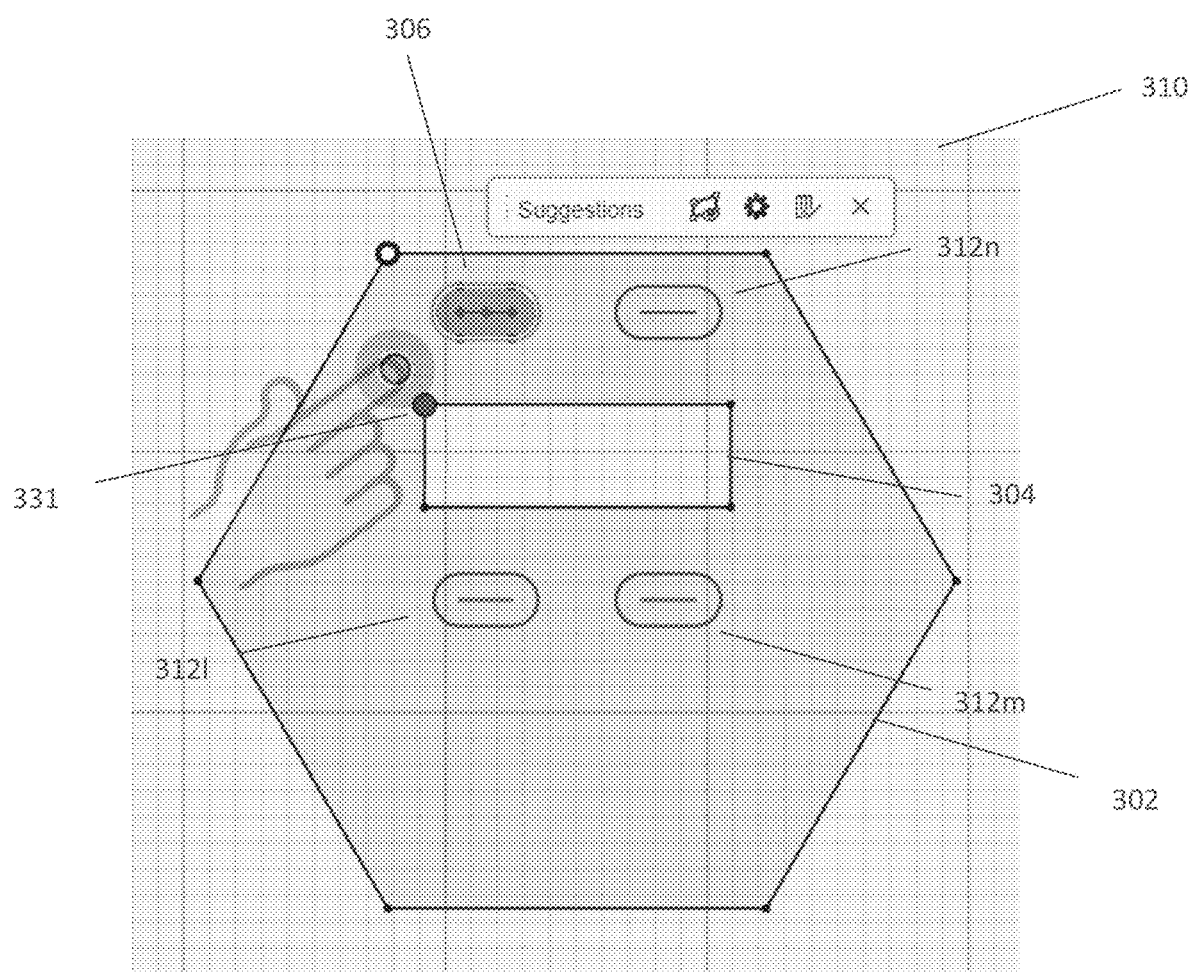

In some implementations, when the orb 314 is being dragged, the viable co-vertex/drop point which is nearest from the current position of the orb is darkened and the suggestions offered by that co-vertex are shown. All other viable co-vertices/drop points are shown as empty circles slightly smaller in size than the orb 314 being dragged. When the user releases the orb 314, the orb 314 is snapped to whichever drop point is darkened at the moment of releasing the orb 314. In FIG. 3D, the upper left corner of the hexagon is darkened because it is the nearest drop point from the orb 314 at that time. Suggestions offered by the darkened co-vertex are shown. The upper left corner of the cut out is an empty circle because it is a drop point but not the nearest one at that time. In FIG. 3E, as the user drags the orb 314 further down, the upper left corner of the cut out is darkened because it is nearest drop target from the orb at that time. Suggestions offered by the new darkened co-vertex are now shown. The upper left corner of the hexagon now turns into an empty circle because it is no longer the nearest one.

Thus, in a typical implementation, as the orb 314 is being dragged, if the orb 314 enters a space near (e.g., within some predetermined distance of) one of the potential drop point (i.e., one of the viable alternative co-vertices), the computer may update what the user sees on the screen to show a new set of suggestions (see, e.g., 3121-312n in FIG. 3E) that are based on the potential drop point being a new reference co-vertex. The computer 100 in that instance may change the onscreen appearance of the potential drop point 331 to indicate its new status as a potential reference co-vertex for the new suggestions. In a typical implementation, the computer 100 also changes the onscreen appearance of the previous reference co-vertex (at the upper left corner of the hexagon) to indicate that the previous reference co-vertex is now just another viable alternative co-vertex (and no longer a reference co-vertex for the new suggestions being displayed).

An example of this is shown in FIG. 3E, which shows how the screen would appear when the user's finger 318 has dragged the orb 314 close enough to one of the new potential drop points (i.e., the one at the top left side of the cutout) for the computer to react to the new orb 314 position. As shown, the screenshot has been updated to change the eleven suggestions 312a-312k previously shown (in FIG. 3D) to three new suggestions 3121-312n (in FIG. 3E). These new suggestions 3121-312n would have been determined by the computer 100 based on the new potential drop point (i.e., the one at the top left side of the cutout) being considered a new point co-vertex. Additionally, as shown, the onscreen appearance of the potential drop target has been changed (from an empty circle to a darkened circle) to indicate its new status as the reference co-vertex for the new suggestions. Finally, the onscreen appearance of the previous reference co-vertex (at the upper left side of the hexagon) has been changed (from a darkened circle to an empty circle) to indicate that the previous reference co-vertex is now just another viable alternative co-vertex (and no longer acting as a reference co-vertex for the new suggestions).

If the orb 314 is moved from its position in FIG. 3E (closest to the co-vertex at the upper left side of the cutout) to a different position close enough to one of the other viable co-vertices, then the computer would update the appearance of the design to show a new set of suggestions using the then-closest viable co-vertex as the reference co-vertex.

Figure 3F:
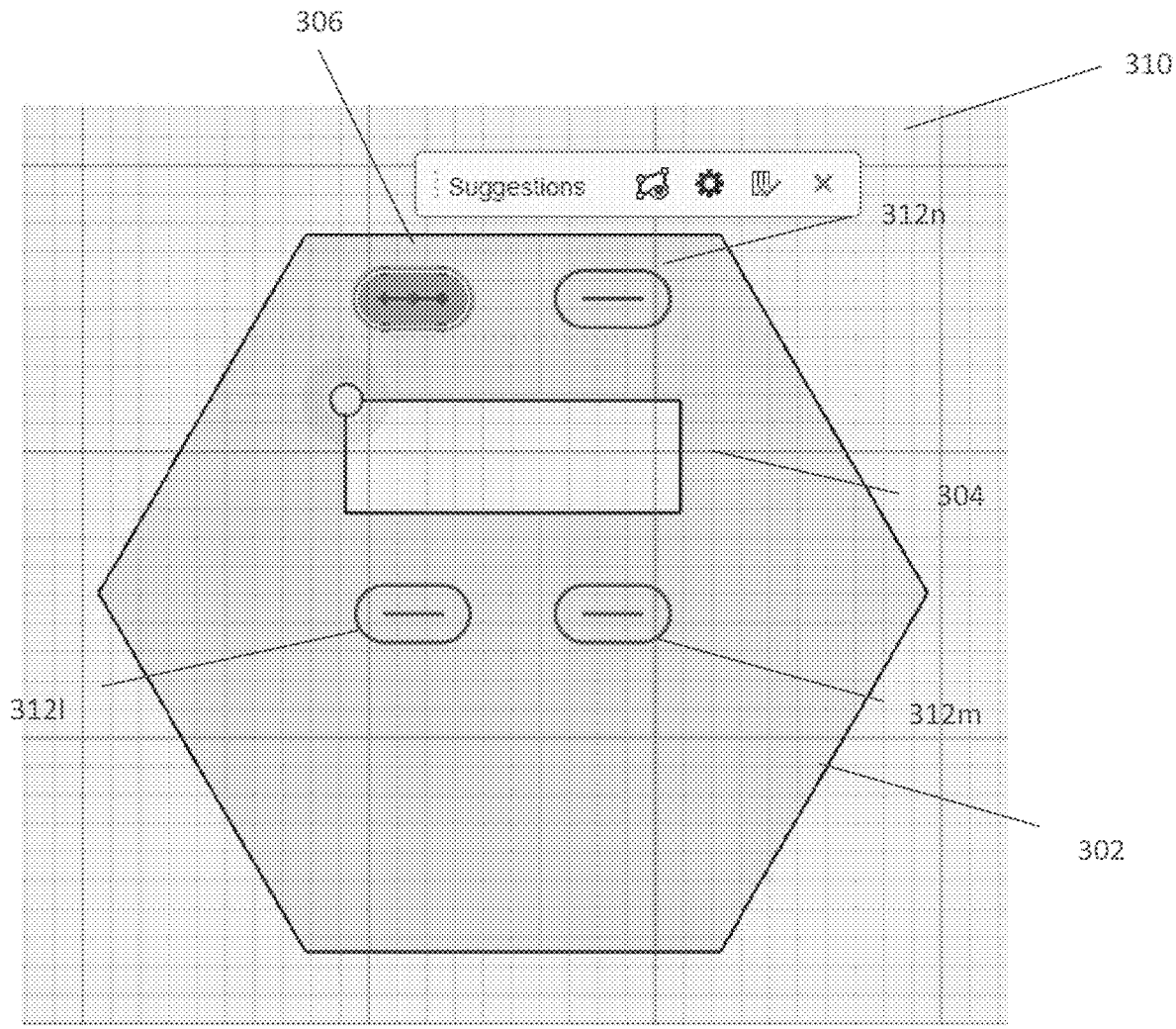
Figure 3G:
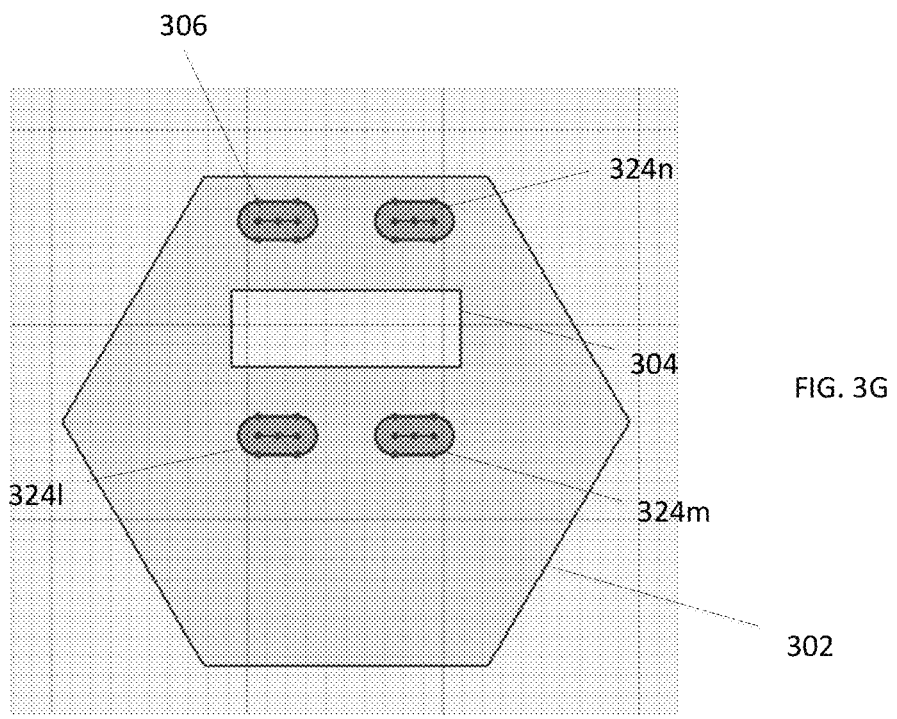

In a typical implementation, when a potential drop point is darkened (e.g., brown), as shown in FIG. 3E, and the orb 314 is released, the computer 100 causes the orb 314 to snap to the darkened drop point and the new suggestions will be on the screen until the user accepts, rejects or otherwise takes steps to change the suggestions. An example of this is shown in FIG. 3F, where the illustrated design includes the original, user-created geometric feature (i.e., obround 306) and the three suggestions 3121-312n that the computer 100 calculated using the co-vertex at the inner edge, left side of the cutout as a reference co-vertex. In the illustrated screenshot, the reference co-vertex (at the inner edge, left side of the cutout) is identified by one circle, and the original reference co-vertex is identified by another circle. In a typical implementation, these circles may be color coded, or otherwise visually distinguishable from one another onscreen.

If, at any point in time, the user accepts the onscreen suggestions 3121-312n (e.g., by selecting the accept suggestions icon 316c in the suggestions context menu 310), the computer 100 incorporates the onscreen suggestions 3121-

312*n* into the design. Thus, if the user selects the accept suggestions icon 316*c* in the suggestions context menu 310 of FIG. 3F, the computer 100 incorporates the three onscreen suggestions 3121-312*n* into the design. The system then presents to the user a screen such as the one shown in FIG. 3G, which includes the prior suggestions 3121-312*n* incorporated into the design as actual geometric entities 3241-324*n*.

The example above illustrates how the computer 100 might enable users to prompt the computer 100 to change its predictions/suggestions by dragging and dropping the orb (that identifies the reference co-vertex for the predictions/suggestions) from its original location to another viable alternative co-vertex. As mentioned above, however, there are other ways that the computer 100, in various implementations, might enable a user to prompt the computer 100 (see, e.g., 218 in FIG. 2) to calculate and display different predictions/suggestions. For example, FIGS. 4A-4J include a series of screenshots from the display of computer 100 that illustrate an exemplary workflow that shows how predictions/suggestions can be toggled off or on (e.g., by the user clicking or tapping on a button (e.g., a sketch helper command button) using a mouse) and how a "Similarity" option in the computer's settings interface) may be useful.

Figures 4A, 4B, 4C, 4D:
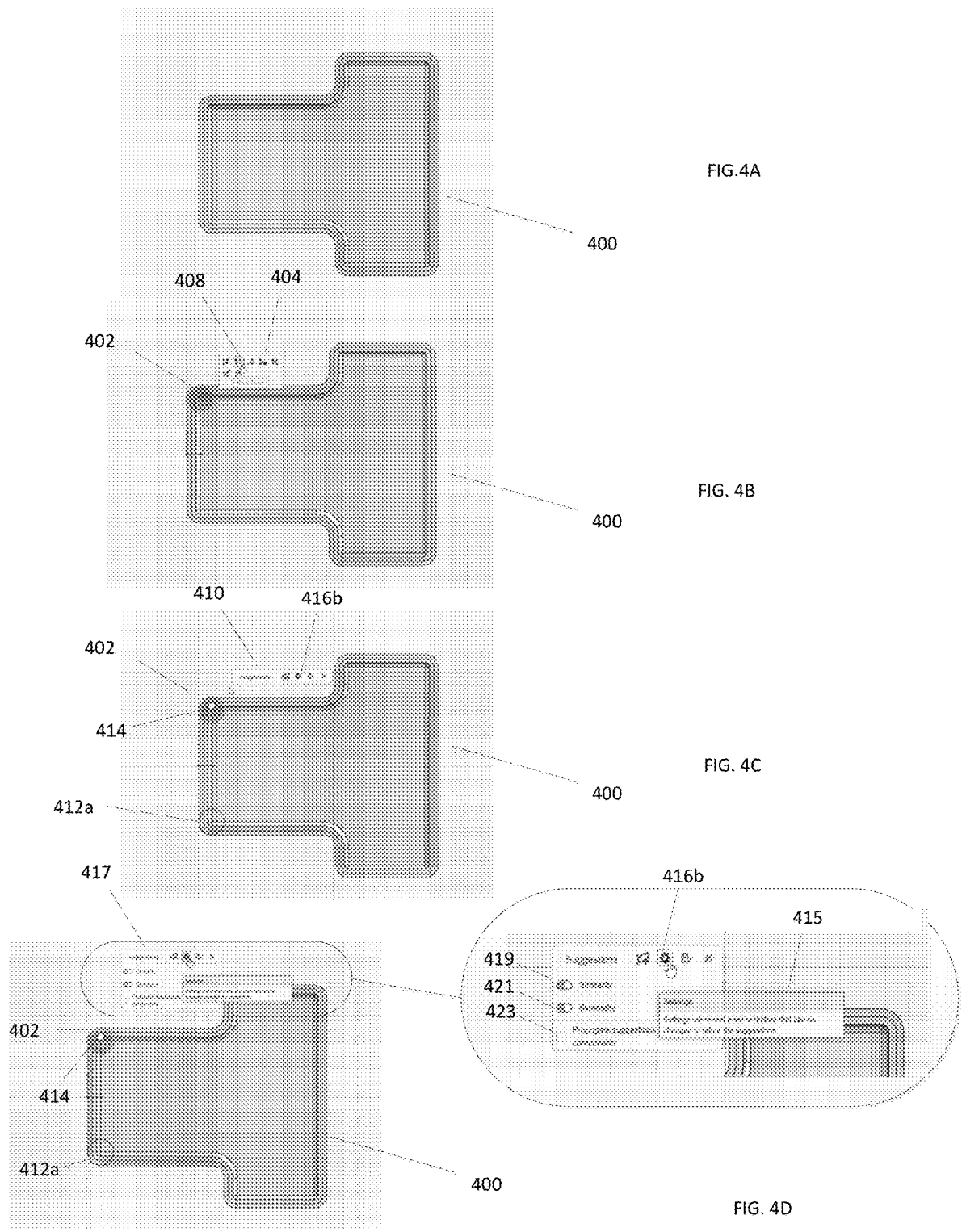
FIGS. 4A-4J show a sequence of partial screenshots that illustrate another example of predictive modeling.

In FIG. 4A, the user creates a base geometry 400, which, in the illustrated example, is a roughly T-shape geometry, on its side.

In FIG. 4B, a user creates a circle 402 at an upper left-hand corner of the base geometry 400. The computer 100 causes a context menu 404 to appear next to the circle 402. The context menu 404 has a user-selectable PM button 408 in it. In some instances, the computer 100 would cause the context menu to appear when the user clicks on the circle.

The user selects the user-selectable PM button 408, which prompts the computer 100 to calculate predictions/suggestions, using the circle as a seed geometry, and display any such predictions/suggestions on screen in the design. FIG. 4C shows an example of a screenshot that the computer 100 might display in response to the user selecting the user-selectable PM button 408. In the illustrated screenshot, only one such prediction/suggestion 412*a* is displayed. The suggestion 412*a* is a circle, just like the seed geometry circle 402.

The screenshot of FIG. 4C also has a suggestions context menu 410 that took the place of the prior context menu 404 that included the user-selectable PM button 408. The suggestions context menu 410 has four user-selectable icons including a settings icon 416*b*, the selection of which causes the computer 100 to present an interface onscreen with various system settings relevant the suggestions functionalities.

The screenshot in FIG. 4C identifies the reference co-vertex by an orb 414 in the upper left corner of the design.

The user then selects the settings icon 416*b*, which causes the computer 100 to present settings options onscreen, again near the design. An example of these settings options is shown in the exemplary settings interface 417 shown in FIG. 4D. Also shown in FIG. 4D is a message 415 that the computer 100 presents to the user when the mouse cursor hovers over the setting icon 416*b*. The message 415 includes information about the available settings and reads, "Settings will reveal a set of factors that can be changed to refine the suggestions." The options shown in the illustrated settings menu include a "similarity" toggle switch 419, a "symmetry" toggle switch 421, and a "propagate suggestions across components" on/off switch 423. In the screenshot of FIG. 4D, the "similarity" and "symmetry" toggle switches are in an on (or activated) position, whereas the "propagate suggestions across components" switch 423 is in an off (or deactivated) position.

Figure 4E:
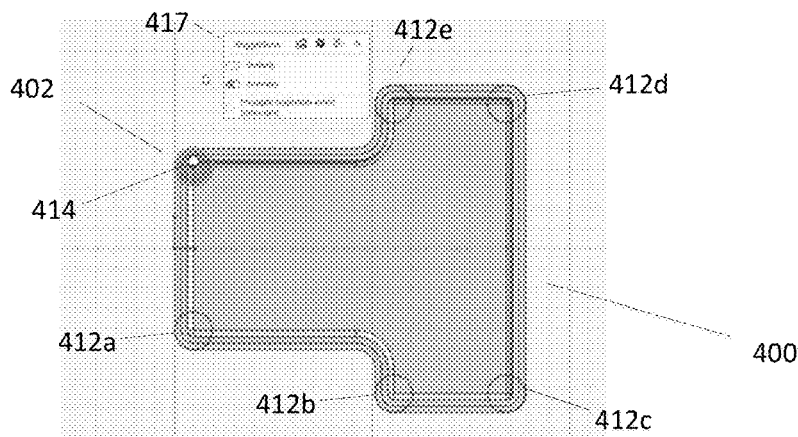

In FIG. 4E, the user turns off the "similarity" option. As a result, the computer 100 shows four more options as additional predictions/suggestions 412*b*-412*e*. While only the original sole prediction/suggestions 412*a* was able to satisfy the restrictions imposed by the "similarity" and "symmetry" options, the original sole prediction/suggestion 412*a*, as well as the additional predictions/suggestions 412*b*-412*e*, are able to satisfy the less stringent restrictions imposed by only the "symmetry" option being active.

Effectively, by turning on "symmetry", the computer 100 looks not just for co-vertices that are similar or identical to the reference co-vertex, but also for co-vertices that appear like or are mirror-images of the reference co-vertex. Regarding similarity, the computer 100 typically omits certain properties from the descriptor if "similarity" is turned off. Effectively, by turning off "similarity", the check for similarity of co-vertices is made less stringent, because of which additional (less similar) co-vertices too may offer suggestions.

Figure 4F:
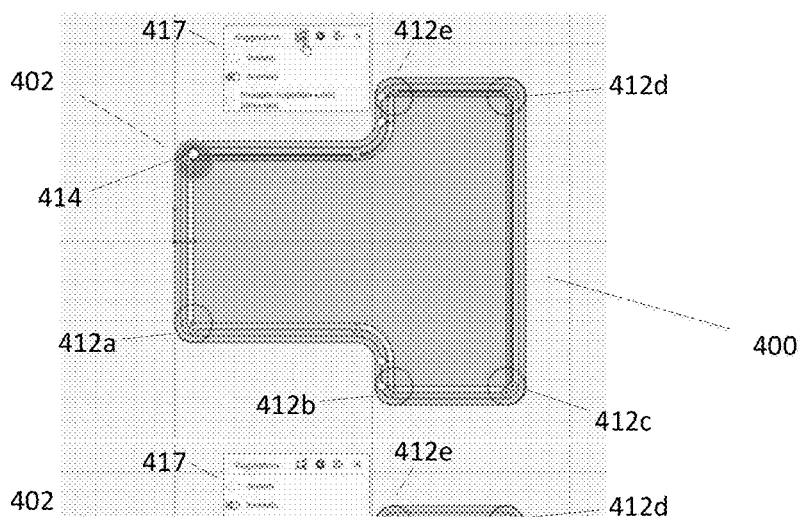

Next, in FIG. 4F, the user clicks on/selects the drop points icon 416*a*. This causes the computer 100 to show all valid drop points (e.g., places for the orb 414 to be moved to define a new reference co-vertex) in the design simultaneously.

Figure 4G:
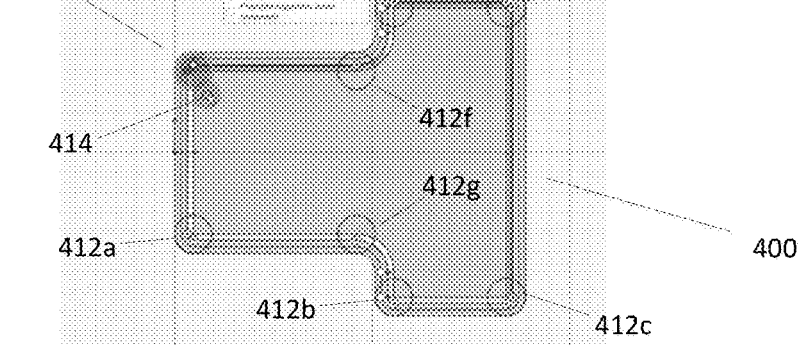

In FIG. 4G, the user starts dragging the orb 414 to one of the valid drop points. As the orb 414 is moved across the screen, the nearest drop point is shown darkened (e.g., in brown) and the suggestions arising from the new drop point are displayed dynamically. For example, in FIG. 4G, the orb 414 is closest to a drop point that is next to, but different than, the original reference co-vertex and, as a result, the computer 100 is showing all of the previously presented predictions/suggestions 412*a*-412*e*, as well as two new predictions/suggestions 412*f* and 412*g*.

Figure 4H:
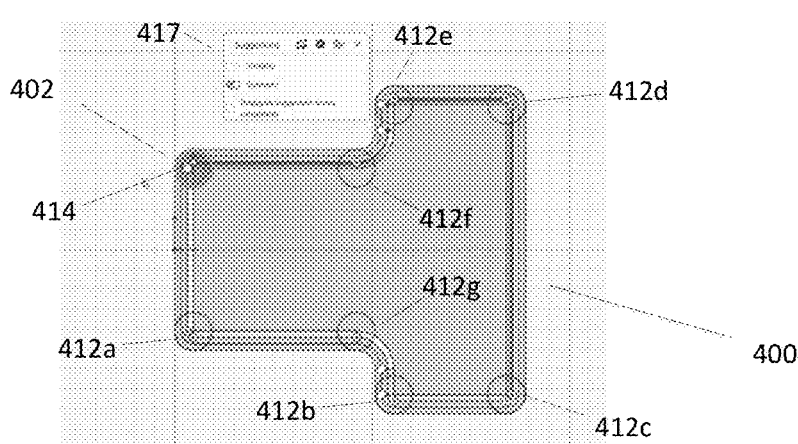

In FIG. 4H, the user drops the orb 414 on the new drop point (next to the original reference co-vertex in the upper left corner of the design). The predictions/suggestions 412*a*-412*g* arising from the new drop point acting as a new reference co-vertex are displayed by the computer 100.

Figure 4I:
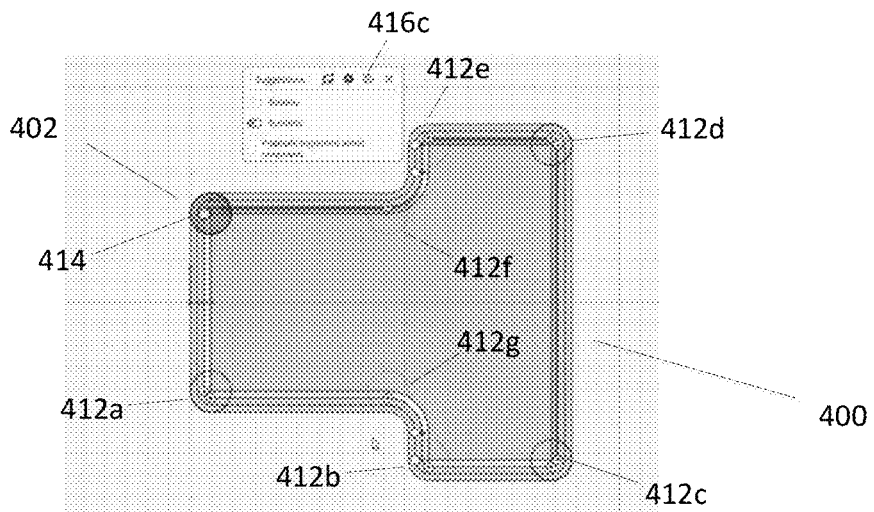

In FIG. 4I, the user clicks on any undesired predictions/suggestions, namely 412*b*, 412*e*, 412*f* and 412*g* which changes these predictions/suggestions 412*b*, 412*e*, 412*f*, and 412*g* to a desaturated appearance. The rest of the predictions/suggestions 412*a*, 412*c*, and 412*d* keep their saturated appearances.

Figure 4J:
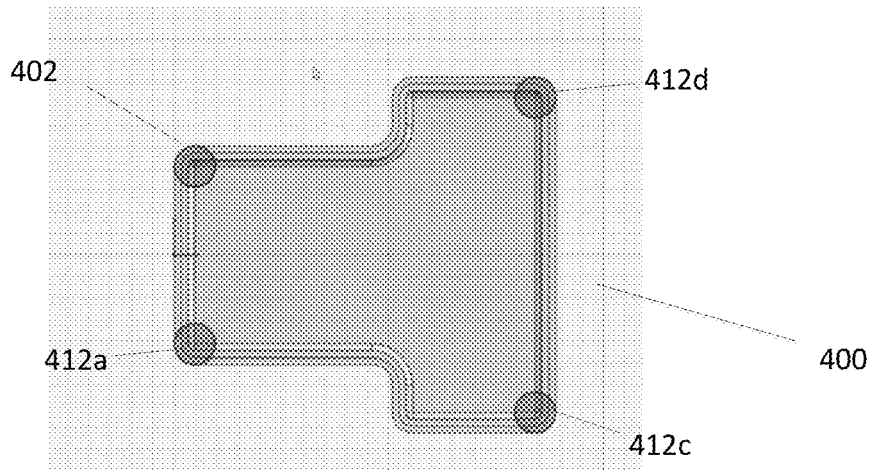

In FIG. 4J, the user accepts the remaining (saturated) predictions/suggestions 412*a*, 412*c*, and 412*d* (e.g., by clicking on the accept icon 416*c* with the green tick). These predictions/suggestions 412*a*, 412*c*, and 412*d* are turned into actual geometric entities in the design, and the desaturated predictions/suggestions 412*b*, 412*e*, 412*f*, and 412*g* disappear from the design and the screen. FIG. 4J thus shows the base geometry 400 with the circle 402 created by the user and the three copies of the circle 412*a*, 412*c*, and 412*d* on screen.

FIGS. 5A-5E include a series of screenshots from the display of computer 100 that illustrate an exemplary workflow that shows how the "symmetry" option (in the settings interface) may be useful.

Figure 5A:
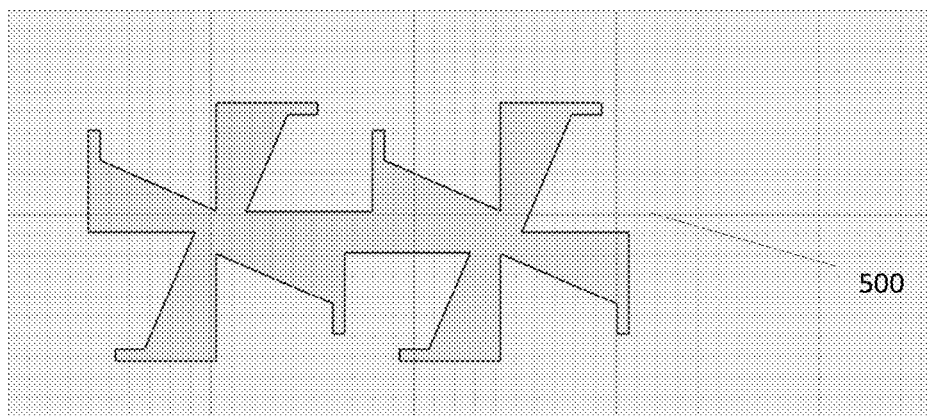
FIGS. 5A-5E show a sequence of partial screenshots that illustrate yet another example of predictive modeling.

In FIG. 5A, the user creates a base geometry 500, which, in the illustrated example, is a complex shape.

Figure 5B:
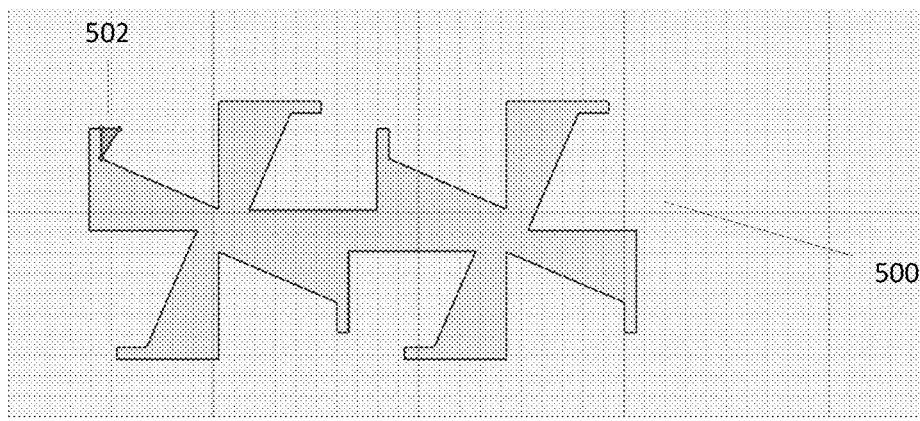

In FIG. 5B, the user draws a triangle 502 at an upper left-hand corner of the base geometry 500. In a typical implementation, in response to the triangle 502 being drawn, the computer 100 would cause a user-selectable PM button (like the one in context menu 404) to appear next to the triangle 502.

Figure 5C:
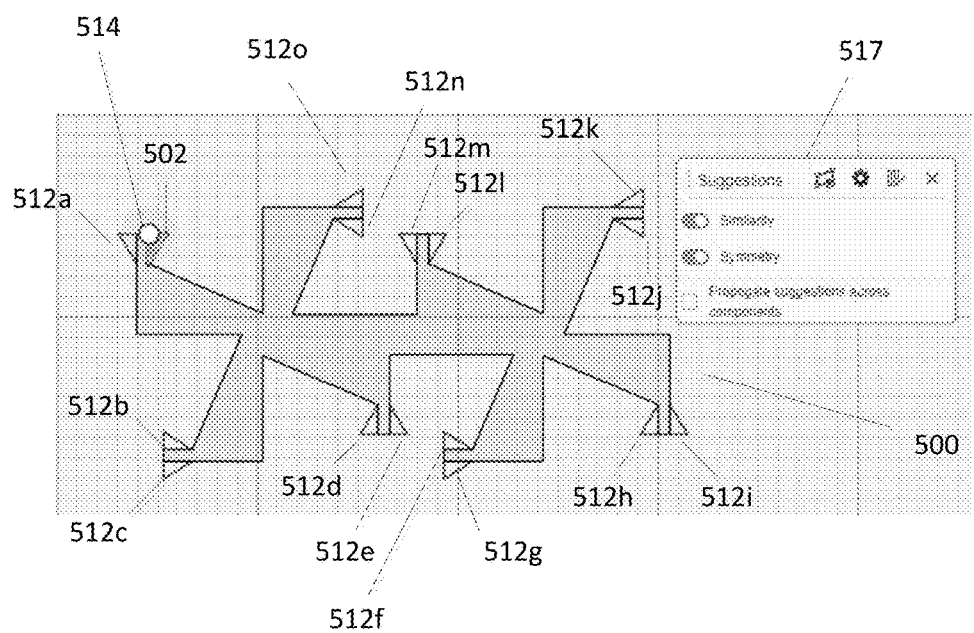

FIG. 5C shows what the computer 100 would present at its screen, if the user selects the user-selectable PM button and then selects the settings option on the resulting context menu. The illustrated screenshot shows the base geometry 500, the most recently created triangle 502, a reference co-vertex (identified by orb 514), a plurality of predictions/suggestions 512a-512o (calculated by the computer 100 using the triangle 502 as a seed geometry), and the suggestions settings context menu 517. The suggestions settings context menu 517 indicates that the "similarity" option and the "symmetry" option are on or active, but the "propagate suggestions across components" option is off or inactive.

Figure 5D:
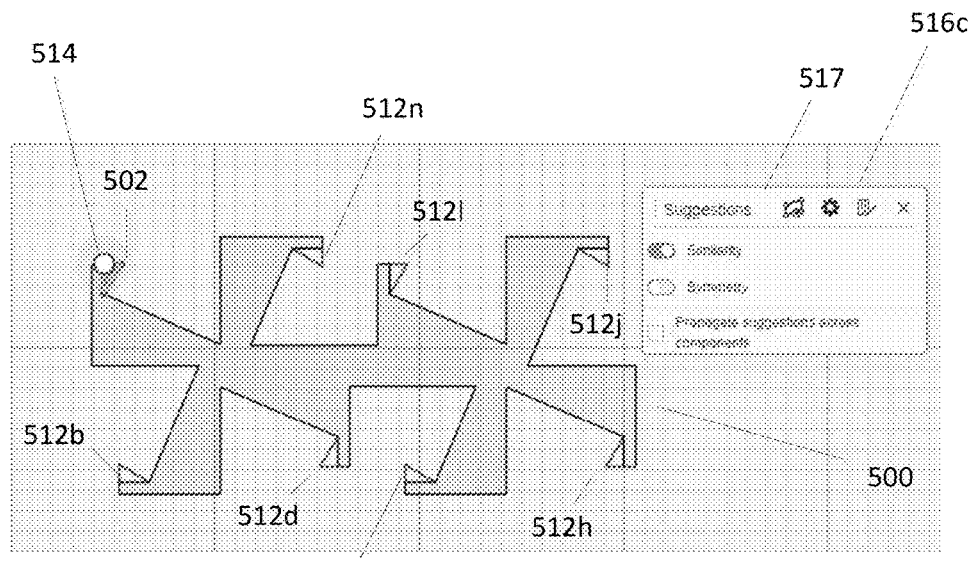

In FIG. 5D, the user toggles off the "symmetry" option off (i.e., makes that option inactive). In response, the computer 100 deletes predictions/suggestions 512a, 512c, 512e, 512g, 512i, 512k, 512m, and 512o, leaving only predictions/suggestions 512b, 512d, 512f, 512h, 512j, 512l, and 512n intact. That is because although predictions/suggestions 512a, 512c, 512e, 512g, 512i, 512k, 512m, and 512o satisfy the criteria required by the computer 100 when the "symmetry" option is on or active, they do not satisfy the criteria required by the computer when only "similarity," but not "symmetry," is on or active.

Figure 5E:
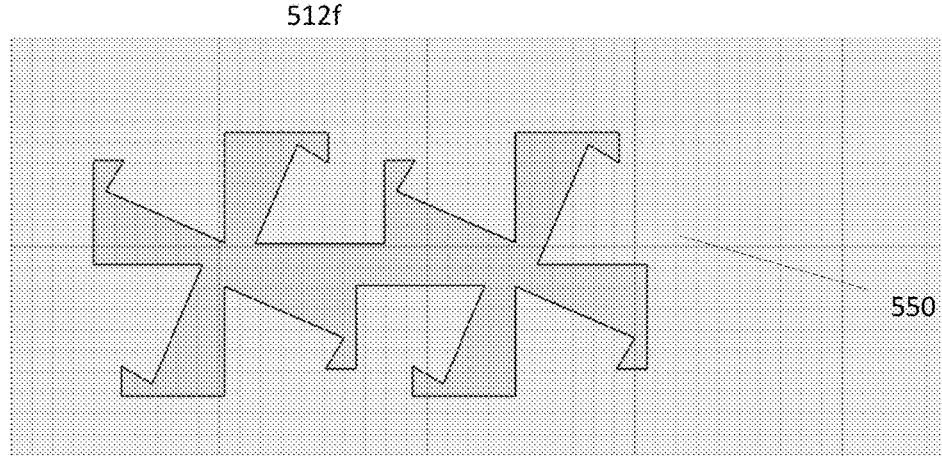

FIG. 5E shows a screenshot that the user would see if the user selects the "accept suggestions" icon 516c (i.e., the check) in FIG. 5D. The screenshot in FIG. 5E includes the base geometry 500 with the user-created triangle 502 and all of the other triangles from FIG. 5D (i.e., based on predictions/suggestions 512b, 512d, 512f, 512h, 512j, 512l, and 512n).

The foregoing illustrates various aspects of the computer's functionalities and capabilities in the context of a user's experience. Now, we turn to consider an exemplary implementation of the processes that are performed by the computer 100 (and that are represented schematically in FIGS. 6A-6C) to calculate predictions/suggestions, which of course facilitates the foregoing user experiences. Certain terminology mentioned herein is explained later on in this document. The reader is invited, therefore, to consider those explanations, if helpful.

The algorithm set forth below assumes that the user has opened a new or a preexisting modeled object in a CAD system for editing. The opened modeled object may be empty, or it may contain one or more three-dimensional (3D) solids, or it may contain one or more two-dimensional (2D) sketches, etc. or it may contain a combination of one or more 3D solids and one or more 2D sketches. It is assumed that the 2D and/or 3D geometries are represented by a boundary representation (B-rep) which is how most modern CAD systems represent 2D and 3D geometries.

In the description that follows, processes and functionalities attributable to the computer 100 may, in some implementations, be performed by the processor 102 of the computer 100, either alone or in conjunction with other components of the computer or otherwise.

Figure 6A:
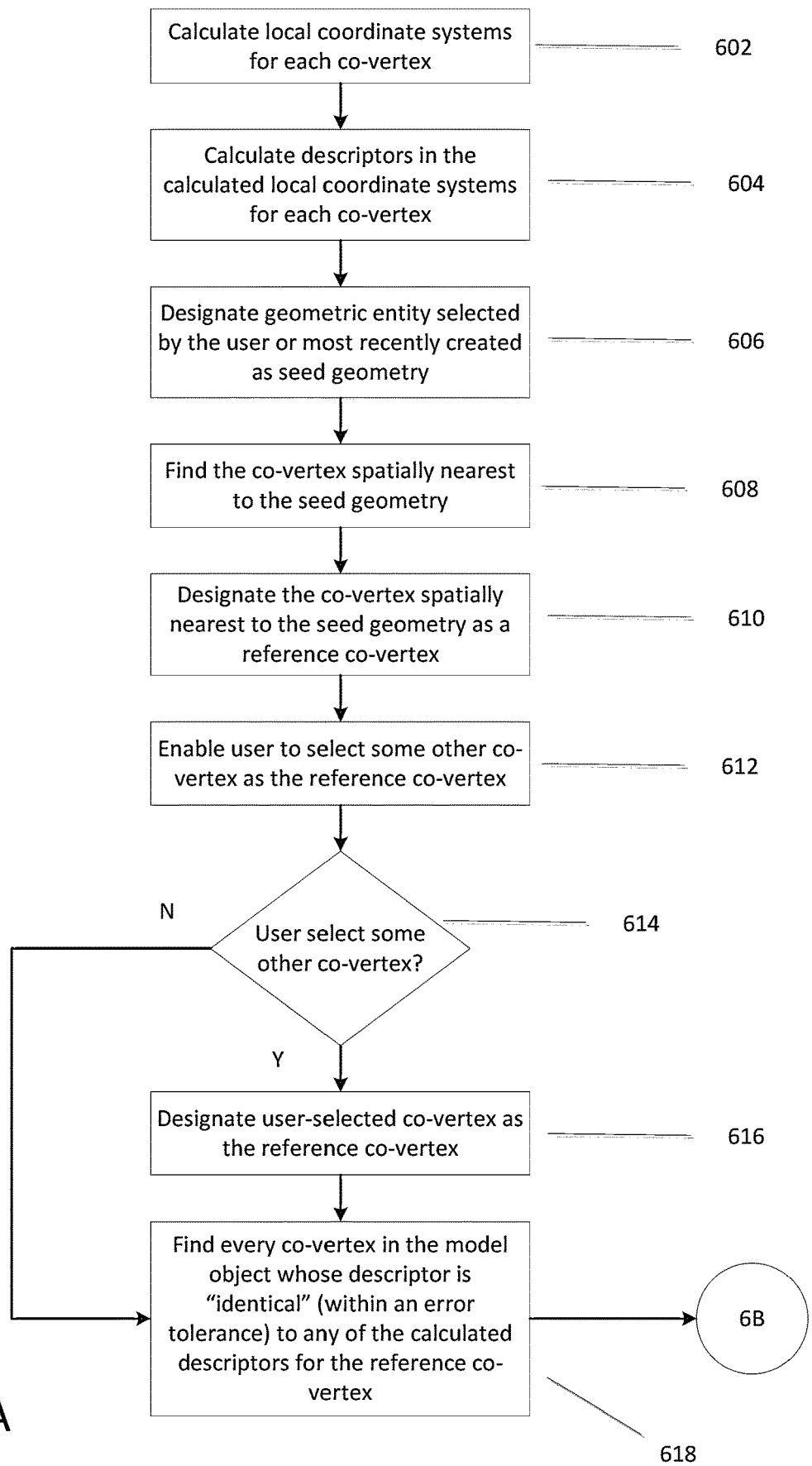
FIGS. 6A-6C is a flowchart that represents one exemplary implementation of a computer-implemented process for calculating predictions/suggestions.
Figure 6B:
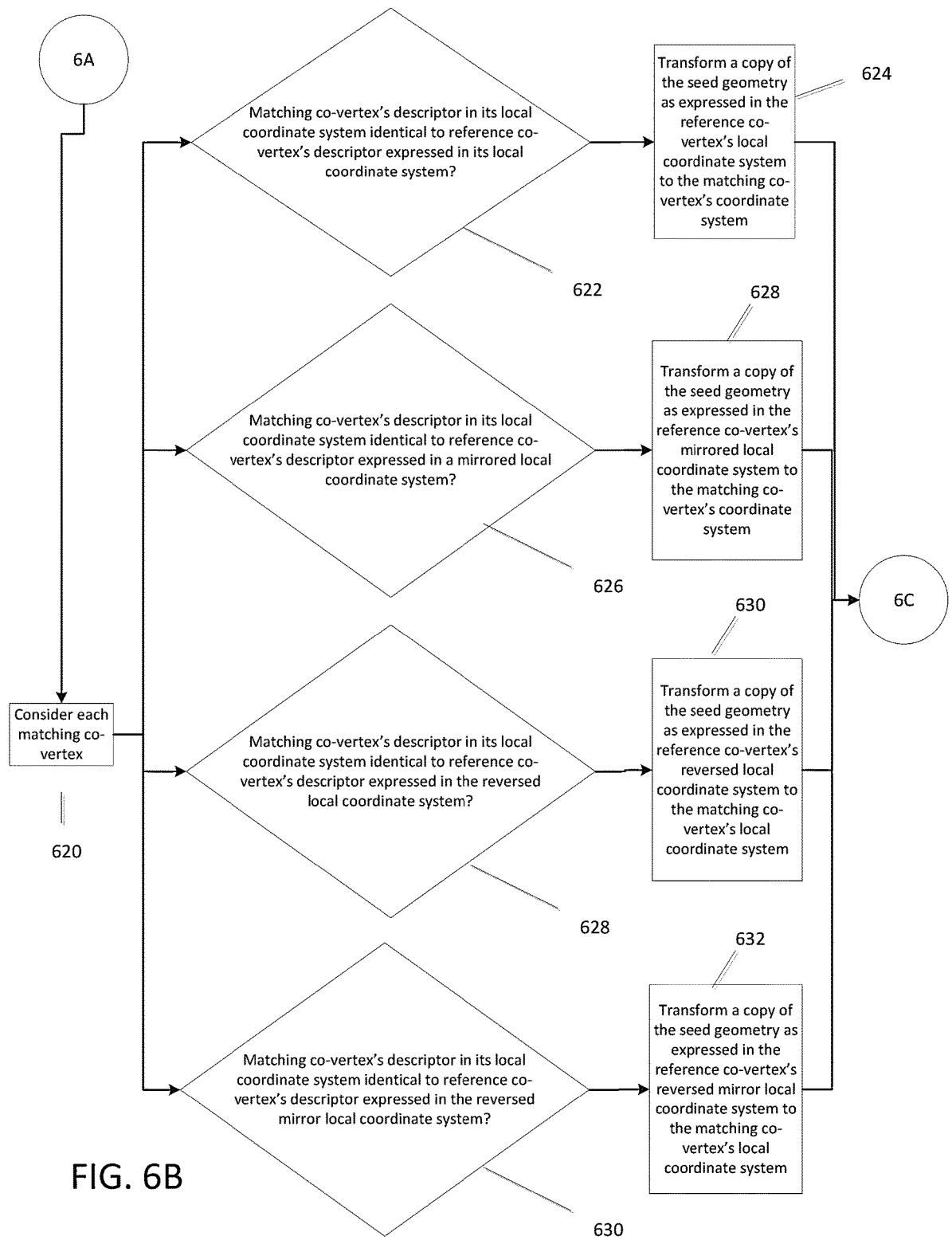
Figure 6C:
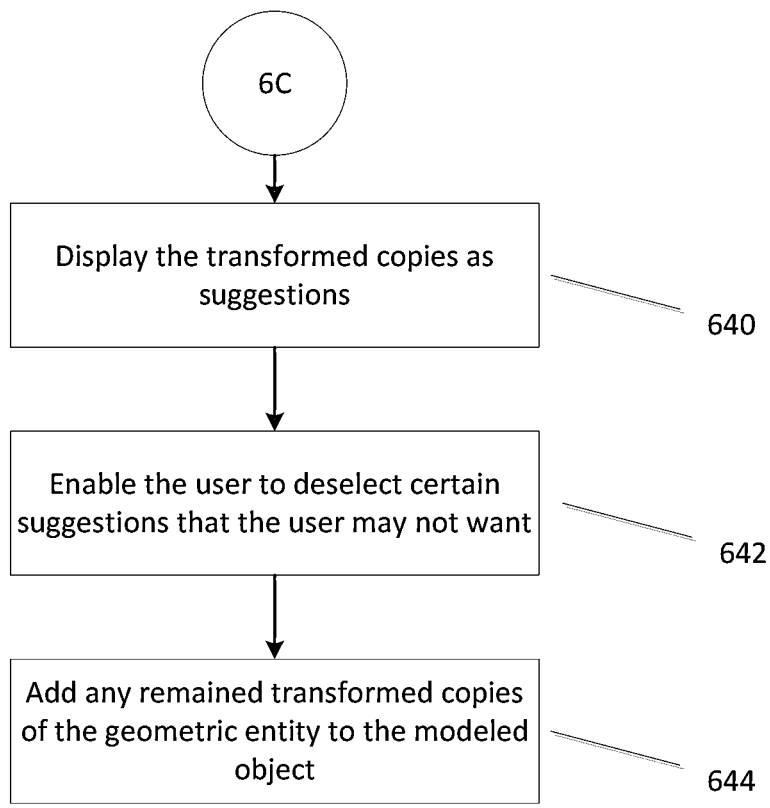

According to the process represented in the flowchart of FIGS. 6A-6C, the computer 100 (at 602) calculates, and stores in memory 106, the following four local coordinate systems for each co-vertex in the modeled object:
  a. a local coordinate system $S_o$ for the co-vertex,
  b. a mirrored local coordinate system $S_m$ for the co-vertex (not needed if "Symmetry" option is off),
  c. a reversed local coordinate system $S_r$ for the co-vertex, and
  d. a reversed mirrored local coordinate system $S_{rm}$ for the co-vertex (not needed if "Symmetry" option is off).

Next, the computer 100 (at 604) calculates, and stores in memory 106, the following four descriptors for each co-vertex in the modeled object:
  a. a Descriptor $D_o$ for the co-vertex expressed in the local coordinate system $S_o$,
  b. a Descriptor $D_m$ for the co-vertex expressed in the mirrored local coordinate system $S_m$ (not needed if "Symmetry" option is off),
  c. a Descriptor $D_r$ for the co-vertex expressed in the reversed local coordinate system $S_r$, and
  d. a Descriptor $D_{rm}$ for the co-vertex expressed in the reversed mirrored local coordinate system $S_{rm}$ (not needed if "Symmetry" option is off).

Next, the computer 100 (at 606) designates/considers the geometric entity or entities most recently created or selected by the user as a seed geometry (i.e., the geometry to be considered for duplication throughout the design).

Next, the computer 100 (at 608) finds the co-vertex that is spatially located nearest to the seed geometry. In a typical implementation, this is done by determining the co-vertex whose position is located the shortest 3D distance from the seed geometry. To find a 3D distance between a position and geometry represented in B-rep form, there are well-known techniques that would be familiar to those having skill in the art.

The computer (at 610) designates this co-vertex (identified as the co-vertex spatially nearest the seed geometry) as the reference co-vertex.

The computer 100 (at 612) enables the user to designate some other co-vertex in the design as the reference co-vertex. As discussed above, one way that the computer 100 enables users to change a reference co-vertex designation is by enabling the user to drag and drop an onscreen orb from a reference co-vertex to a new reference co-vertex. If the user (at 614) opts to designate a different co-vertex as the reference co-vertex, the computer 100 (at 616) recognizes the newly-designated reference co-vertex and proceeds to step 618; otherwise, the computer 100 simply proceeds to step 618.

At step 618 in the illustrated process, the computer 100 finds all co-vertices in the modeled object that match with the reference co-vertex. In some implementations, to find if a particular co-vertex matches with the reference co-vertex, the computer 100 determines whether the descriptor $D_o$ for that particular co-vertex matches identically (or within a predetermined or user-definable error tolerance, which is considered identical for these purposes) any of the four descriptors $D_o$, $D_m$, $D_r$, and $D_{rm}$ of the reference co-vertex.

What the computer does next (see FIG. 6B) depends on how each matching co-vertex matches the reference co-vertex. For each matching co-vertex (620):
  a. If the matching co-vertex's descriptor $D_o$ is identical to the reference co-vertex's descriptor $D_o$ (622), then the computer 100 (at 624) transforms a copy of the seed geometry as expressed in the reference co-vertex's $S_o$ to the matching co-vertex's $S_o$.
  b. If the matching co-vertex's descriptor $D_o$ is identical to the reference co-vertex's descriptor $D_m$ (626), then the computer 100 (at 628) transforms a copy of the seed geometry as expressed in the reference co-vertex's $S_m$ to the matching co-vertex's $S_o$.
  c. If the matching co-vertex's descriptor $D_o$ is identical to the reference co-vertex's descriptor $D_r$ (630), then the computer 100 (at 632) transforms a copy of the seed geometry as expressed in the reference co-vertex's $S_r$ to the matching co-vertex's $S_o$.

d. If the matching co-vertex's descriptor $D_o$ is identical to the reference co-vertex's descriptor $D_{rm}$ (634), then the computer 100 (at 634) transforms a copy of the seed geometry as expressed in the reference co-vertex's local coordinate system $S_{rm}$ to the matching co-vertex's $S_o$.

It should be noted that transforming any geometry from one coordinate system to another can be achieved by standard techniques (e.g., using transformation matrices) that would be familiar to those having skill in the relevant art. Thus, for each matching co-vertex, the computer 100 transforms a copy of the seed geometry from the local coordinate system of the reference co-vertex to a respective local coordinate system of the matching co-vertex.

Next (see FIG. 6C), the computer 100 (at 640) displays the transformed copies of the seed geometry as predictions/suggestions (e.g., visually distinct from other parts of the design) on the computer screen.

As discussed above, the computer 100 then (at 642) enables the user to accept, reject, and/or modify the suggestions. Once the user accepts any of the predictions/suggestions, the computer 100 adds the accepted predictions/suggestions as geometric entities to the modeled object (design).

Unless otherwise indicated, any terminology used in this document should be afforded its ordinary meaning. That said, the following discussion may provide additional insight into the meaning of certain terminology in various instances.

For example, the phrase modeled object may be used herein. 3D design software applications such as CAD (computer-aided design) programs are used for building solid geometry of products being designed. Modeled objects may refer generally to representations of solid geometries in a CAD program. A modeled object may contain none, one or more 3D solids and it may contain none, one or more 2D or 3D sketches. The phrase 3D CAD feature may be used herein. In general, a CAD user may modify a 3D modeled object by creating 3D CAD features like fillets, chamfers, extrudes, cuts, holes, angled drafts, etc. The phrase sketch entity may refer generally to a two or three-dimensional entity like a line segment, an arc, a circle, a spline curve, a construction line, etc. A sketch may be comprised of one or more sketch entities drawn on a sketch plane. The phrase sketch plane normal may be used herein. In some CAD programs, the sketch plane normal is an inherent property of every sketch plane. In general, it is perpendicular to the sketch plane and points in the direction from which the sketch is supposed to be (or is) viewed.

Terminology and Related Concepts

As indicated above, Boundary Representation, or B-Rep, is used to represent a modeled object by most modern CAD programs. In this representation, a modeled object is represented by a hierarchical relationship between different topological elements, namely solids, shells, faces, co-edge chains, co-edges, edges, co-vertices and vertices. FIG. 7 is a schematic representation of an exemplary hierarchical relationship between the different topological elements in a boundary representation of a modeled object. According to the illustrated implementation, a solid is represented by its bounding shells, a shell is represented by a set of connected face, a face is represented by its bounding co-edge chains, and a co-edge chain is represented by an ordered list of co-edges that are connected by co-vertices. A co-edge chain may be closed, that is, it may loop back on itself, when used in the context of bounded geometry. A co-edge chain may be open when used in the context of a sketch. A co-edge chain may belong to a face called as its parent face. A co-edge chain inside a sketch may exist without a parent face. Moreover, according to the illustrated implementation, a co-edge is the representation of an edge in the context of a particular co-edge chain. The orientation the co-edge can differ from the orientation the edge. A co-edge is bounded by two co-vertices, the start co-vertex and the end co-vertex. The choice of which co-vertex is considered as start co-vertex and which is considered as the end co-vertex may be determined by which one occurs first in an ordered chain of the co-edges. A co-edge always belongs to a single co-edge chain, which may be referred to as its parent co-edge chain. According to the illustrated implementation, an edge is described by the curve/line where two faces meet. The number of co-edges referring to every edge is equal to the number of co-edge chains that edge participates in. In sketches, an edge may have one or more co-edges. In manifold solids, every edge has two co-edges. In sheet models, an edge may have only one co-edge. In non-manifold solids, an edge may have more than two co-edges. Moreover, according to the illustrated implementation, a co-vertex is the representation of a vertex in the context of a particular co-edge chain. A co-vertex acts as the end co-vertex of its previous co-edge and as the start co-vertex of its next co-edge. A co-vertex always belongs to a single co-edge chain called as its parent co-edge chain. A vertex may be described by the point where two or more edges meet. The number of co-vertices referring to every vertex is generally equal to the number of co-edge chains that the vertex participates in. A reference co-vertex is the co-vertex that indicates the context of the surrounding region to be considered for calculating the predictions/suggestions.

It is worth pointing out a few notes on the orientation of co-edge chains. For co-edge chains in 3D solids: Every CAD system usually follows some convention with regards to the orientation of closed co-edge chains in 3D solids. A popular convention is to use what is known as the right-hand rule, according to which, if you align your thumb with the face normal direction or sketch plane normal direction and the first finger with the orientation of the co-edge chain, then second finger should point in the direction of the region enclosed by the closed co-edge chain. For co-edge chains in sketches: Co-edge chains in sketches may not stick to any one orientation convention. As a result, in a sketch, two geometrically identical co-edge chains may have opposite orientations.

The start direction of a co-edge generally refers to the direction beginning from the start point of the co-edge and going inwards towards the interior of the edge. In this document, we refer to the start direction of a co-edge as the direction beginning from the end point of the co-edge and going inwards towards the interior of the edge. Note that this is exactly opposite to the direction that is generally considered in literature as the end direction of a co-edge. We choose to refer to it this way because it causes the start and end co-edge directions to become independent of the orientation or the co-edge chain and makes it convenient to perform calculations related to reverse and mirror co-vertices.

In the context of a face, the face normal direction generally refers to the direction that is perpendicular to the given face at a given point on the face and that points outwards from the region enclosed by the shell that the face belongs to. In the context of a sketch, the face normal direction is same as the sketch plane normal. In the context of a face, the face normal direction of the co-vertex generally refers to the face normal direction of the parent face of the co-vertex at the point of the co-vertex. If the context is a sketch, the face normal direction of the co-vertex is the same as the sketch plane normal direction.

A geometric entity may be any of a 2D sketch entity (like a line segment, an arc, a circle, a spline curve, etc.), or a 3D CAD feature (for example, an extrude, a cut, a hole).

A local coordinate system of a co-vertex ($S_o$) is generally a coordinate system whose:
- origin coincides with the position of the co-vertex
- z-axis is aligned with the face normal direction at the co-vertex
- x-axis is aligned with the start direction of the next co-edge of the co-vertex
- y-axis is aligned with the cross product of the z and x directions ($\vec{y} := \vec{z} \times \vec{x}$)

In the case when the given co-vertex is the last co-vertex in the co-edge chain, which means that there is no next co-edge to the co-vertex, then the origin and z-axis would be defined in same manner as given above however, in that case the:
- y-axis is aligned with the end direction of the previous co-edge
- x-axis is aligned with the cross product of the y and z directions ($\vec{x} := \vec{y} \times \vec{z}$)

This coordinate system is a right-handed coordinate system.

A mirrored local coordinate system of a co-vertex ($S_m$) is generally a coordinate system whose:
- origin coincides with the position of the original co-vertex
- z-axis is aligned opposite to the face normal direction at the co-vertex
- x-axis is aligned with the end direction of the previous co-edge of the co-vertex
- y-axis is aligned with the cross product of the z and x directions ($\vec{y} := \vec{z} \times \vec{x}$)

In the case when the given co-vertex is the first co-vertex in the co-edge chain, which means that there is no previous co-edge to the co-vertex, then the origin and z-axis would be defined in the same manner as given above however, in that case the:
- y-axis is aligned opposite to the start direction of the next co-edge
- x-axis is aligned with the cross product of the y and z directions ($\vec{x} := \vec{y} \times \vec{z}$)

A reversed local coordinate system of a co-vertex ($S_r$) is generally a coordinate system whose:
- origin coincides with the position of the co-vertex
- z-axis is aligned with the face normal direction at the co-vertex
- x-axis is aligned with the end direction of the previous co-edge of the co-vertex
- y-axis is aligned with the cross product of the z and x directions ($\vec{y} := \vec{z} \times \vec{x}$)

In the case when the given co-vertex is the first co-vertex in the co-edge chain, which means that there is no previous co-edge to the co-vertex, then the origin and z-axis would be defined in the same manner as given above however, in that case the:
- y-axis is aligned opposite to the start direction of the next co-edge
- x-axis is aligned with the cross product of the y and z directions ($\vec{x} := \vec{y} \times \vec{z}$)

A reversed mirrored local coordinate system of a co-vertex ($S_{rm}$) is generally a coordinate system whose:
- origin coincides with the position of the original co-vertex
- z-axis is aligned opposite to the face normal direction at the co-vertex
- x-axis is aligned with the start direction of the next co-edge of the co-vertex
- y-axis is aligned with the cross product of the z and x directions ($\vec{y} := \vec{z} \times \vec{x}$)

In the case when the given co-vertex is the last co-vertex in the co-edge chain, which means that there is no next co-edge to the co-vertex, then the origin and z-axis would be defined in same manner as given above however, in that case the:
- y-axis is aligned opposite to the end direction of the previous co-edge
- x-axis is aligned with the cross product of the y and z directions ($\vec{x} := \vec{y} \times \vec{z}$)

Note: The symbol "$:=$" has been used to indicated assignment. For example, $\vec{x} := \vec{y} \times \vec{z}$ means that $\vec{x}$ has to be assigned the value of $\vec{z} \times \vec{y}$.

The phrase co-vertex descriptor generally refers to an ordered array of specific numeric properties of a co-vertex and the surrounding local region around it in the co-edge chain. All quantities in the descriptor are expressed in one of the four possible local coordinate system of the co-vertex, $S_o$, $S_m$, $S_r$ and $S_{rm}$. A co-vertex descriptor may consist of two parts α and β. The descriptor may be formed by concatenating the two parts. The sequence of concatenation may depend on which kind of coordinate system the descriptor is being expressed in. For coordinate systems $S_o$ and $S_{rm}$, the β part may be placed after the α part. For coordinate systems $S_m$ and $S_r$, the α part may be placed after β part.

In general, the α part of the descriptor refers to properties related to the previous co-edge in the co-edge chain (i.e., the co-edge that starts from the previous co-vertex in the co-edge chain and ends at the given co-vertex):

i. $p^{prev}$ (three real numbers): Local x, y and z coordinates of the previous co-vertex (omitted if Similarity option is off)

ii. $V_{start}^{prev}$ (three real numbers): Local x, y and z components of the start direction of the previous co-edge (omitted if Similarity option is off)

iii. $V_{end}^{prev}$ (three real numbers): Local x, y and z components of the end direction of the previous co-edge iv. $V_{end}^{prev2}$ (three real numbers): Local x, y and z components of the end direction of the co-edge previous to the previous co-edge (omitted if Similarity option is off).

In general, the β part of the descriptor refers to properties related to the next co-edge in the co-edge chain (i.e., the co-edge that starts from the given co-vertex and ends at the next co-vertex in the co-edge chain)

i. $p^{next}$ (three real numbers): Local x, y and z coordinates of the next co-vertex (omitted if Similarity option is off)

ii. $V_{start}^{next}$ (three real numbers): Local x, y and z components of start direction of the next co-edge iii. $V_{end}^{next}$ (three real numbers): Local x, y and z components of end direction of the next co-edge (omitted if Similarity option is off)

Iv. $V_{start}^{next2}$ (three real numbers): Local x, y and z components of start direction of the co-edge next to the next co-edge (omitted if Similarity option is off).

Furthermore, as another possible implementation (which is what is demonstrated in the illustrations), one of the two parts is omitted from the descriptor. This results in making the check for identical descriptors less strict. If the check for identical descriptors needs to be made stricter, then some additional properties could be added to the descriptor, such as the local coordinates of the mid-points of the corresponding co-edges, the radius of curvature of the co-edges at the start, and/or middle and/or end points of the co-edges.

In general, the phrases 'local x, y and z coordinates' and 'local x, y and z components' used herein mean that the x, y and z values are expressed in the given coordinate system of the co-vertex, which may be any of:
  a. local coordinate system of the co-vertex
  b. mirrored local coordinate system of the co-vertex
  c. reversed local coordinate system of the co-vertex
  d. reversed mirrored local coordinate system of the co-vertex In the case when the co-vertex in question is the last co-vertex of an open co-edge chain and there is no next co-edge to the co-vertex, then the computer may fill the $\beta$ part of the descriptor array with zeroes, so that the length of the array remains unchanged. In the case when the co-vertex in question is the first co-vertex an open co-edge chain and there is no previous co-edge to the co-vertex, then the computer may fill the $\alpha$ part of the descriptor array with zeroes, so that the length of the array remains unchanged. In an exemplary implementation, when the "Similarity" option is turned off, the computer omits the properties $p^{prev}$, $V_{start}^{prev}$, $V_{end}^{prev2}$, $p^{next}$, $V_{end}^{next}$, $V_{start}^{next2}$ from the descriptors. For descriptors $D_o$ and $D_{rm}$, the two parts of the descriptor may be concatenated such that $\beta$ part is placed after $\alpha$ part. For descriptors $D_m$ and $D_r$, the two parts of the descriptor may be concatenated such that $\alpha$ part is placed after $\beta$ part.

Keeping four descriptors per co-vertex allows the algorithm to become independent of the orientation or the co-edge chains. It also allows the algorithm to provide suggestions at co-vertices which happen to be mirror images of the seed co-vertex. Here is how:
  If $D_o$ of a given co-vertex matches with $D_m$ of the seed co-vertex then it means that the given co-vertex is identical to the seed co-vertex.
  If $D_o$ of a given co-vertex matches with $D_m$ of the seed co-vertex then it means that the given co-vertex would have been identical to the seed co-vertex had the co-edge chain of the seed co-vertex been a mirror image of its current form.
  If $D_o$ of a given co-vertex matches with $D_r$ of the seed co-vertex then it means that the given co-vertex would have been identical to the seed co-vertex had the orientation of the co-edge chain been reversed.
  If $D_o$ of a given co-vertex matches with $D_{rm}$ of the seed co-vertex then it means that the given co-vertex would have been identical to the seed co-vertex had the co-edge chain of the seed co-vertex been a mirror image of its current form with its orientation reversed.

Figure 8:
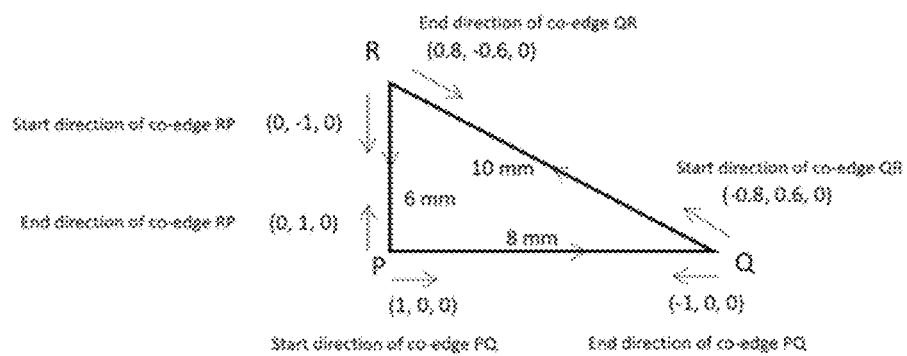
FIGS. 8-12 are a series of images relating to a particular example of predictive modeling.

Let us take an example with illustrations that takes us through an exemplary implementation of the algorithm set forth above. Consider the triangular co-edge chain in FIG. 8. The lengths of the sides of the triangle are 8 mm, 6 mm and 10 mm as indicated in the figure. None of the figures are to scale.

The arrow heads drawn on the middle of the three sides indicate the anti-clockwise orientation of the co-edge chain. The six unit-vectors indicate the start and end directions of the co-edges.

Figure 9:
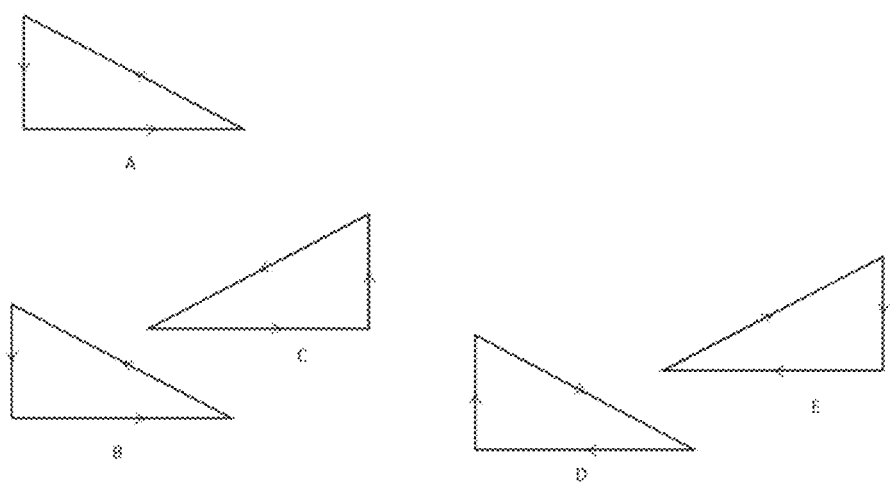
Figure 10:
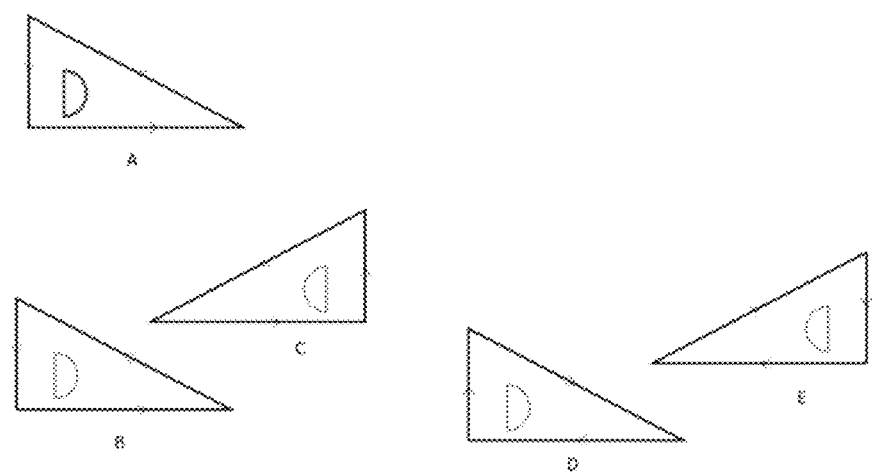

FIG. 9 shows five co-edge chains A, B, C, D, E constructed with the same measurements as the previously shown triangle. As mentioned before, the arrow heads drawn in the middle of the sides indicate the orientation of the co-edges. Note that:
  A and B are identical co-edge chains
  A and C have the same orientations (anticlockwise) and their shapes are mirror images of each other
  A and D have opposite orientations, but their shapes are identical
  A and E have opposite orientations and their shapes are mirror images of each other Let us say the user draws a semicircle inside the co-edge chain A as shown by the semicircle in triangle A of FIG. 10. The semicircles inside triangles B, C, D and E in FIG. 10 represent the suggestions that would be calculated by one implementation of the algorithm. Let us see how the algorithm arrives at these suggestions.

Figure 11:
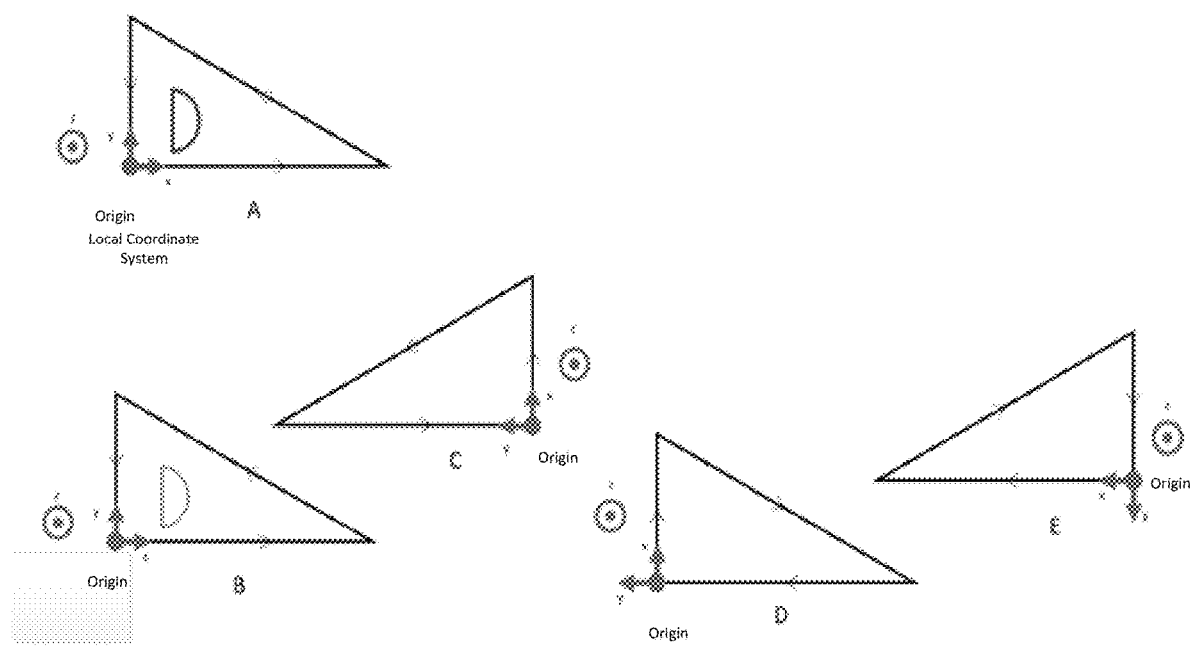

FIG. 11 shows the local coordinate system $S_o$ of the co-vertex at the right-angled corner of each of the co-edge chains A, B, C, D and E.

| Co-edge chain | Descriptor type | $p^{prev}$ | $V_{start}^{prev}$ | $V_{end}^{prev}$ | $V_{end}^{prev2}$ |
|---|---|---|---|---|---|
| B | $\alpha$ part of $D_o$ | 0, 6, 0 | 0, −1, 0 | 0, 1, 0 | 0.8, −0.6, 0 |
| C | $\alpha$ part of $D_o$ | 0, 8, 0 | 0, −1, 0 | 0, 1, 0 | 0.6, −0.8, 0 |
| D | $\alpha$ part of $D_o$ | 0, −8, 0 | 0, 1, 0 | 0, −1, 0 | −0.6, −0.8, 0 |
| E | $\alpha$ part of $D_o$ | 0, −6, 0 | 0, 1, 0 | 0, −1, 0 | 0.8, 0.6, 0 |
| A | $\alpha$ part of $D_o$ | 0, 6, 0 | 0, −1, 0 | 0, 1, 0 | 0.8, −0.6, 0 |

| Co-edge chain | Descriptor type | $p^{next}$ | $V_{start}^{next}$ | $V_{end}^{next}$ | $V_{start}^{next2}$ |
|---|---|---|---|---|---|
| B | $\beta$ part of $D_o$ | 8, 0, 0 | 1, 0, 0 | −1, 0, 0 | −0.8, 0.6, 0 |
| C | $\beta$ part of $D_o$ | 6, 0, 0 | 1, 0, 0 | −1, 0, 0 | −0.6, 0.8, 0 |
| D | $\beta$ part of $D_o$ | 6, 0, 0 | 1, 0, 0 | −1, 0, 0 | 0.6, 0.8, 0 |
| E | $\beta$ part of $D_o$ | 8, 0, 0 | 1, 0, 0 | −1, 0, 0 | −0.8, −0.6, 0 |
| A | $\beta$ part of $D_o$ | 8, 0, 0 | 1, 0, 0 | −1, 0, 0 | −0.8, 0.6, 0 |

| Co-edge chain | Descriptor type | Descriptor array |
|---|---|---|
| B | Full $D_o$ ($\alpha + \beta$) | 0, 6, 0, 0, −1, 0, 0, 1, 0, 0.8, −0.6, 0, 8, 0, 0, 1, 0, 0, −1, 0, 0, −0.8, 0.6, 0 |
| C | Full $D_o$ ($\alpha + \beta$) | 0, 8, 0, 0, −1, 0, 0, 1, 0, 0.6, −0.8, 0, 6, 0, 0, 1, 0, 0, −1, 0, 0, −0.6, 0.8, 0 |
| D | Full $D_o$ ($\alpha + \beta$) | 0, −8, 0, 0, 1, 0, 0, −1, 0, −0.6, −0.8, 0, 6, 0, 0, 1, 0, 0, −1, 0, 0, 0.6, 0.8, 0 |
| E | Full $D_o$ ($\alpha + \beta$) | 0, −6, 0, 0, 1, 0, 0, −1, 0, 0.8, 0.6, 0, 8, 0, 0, 1, 0, 0, −1, 0, 0, −0.8, −0.6, 0 |
| A | Full $D_o$ ($\alpha + \beta$) | 0, 6, 0, 0, −1, 0, 0, 1, 0, 0.8, −0.6, 0, 8, 0, 0, 1, 0, 0, −1, 0, 0, −0.8, 0.6, 0 |

[Note: The +symbol in ($\alpha+\beta$) indicates concatenation, not summation].

These tables show the values of all the quantities inside the $D_o$ descriptors of the co-vertex at the right-angled corner of each of the co-edge chains A, B, C, D and E. One can see that both $\alpha$ and $\beta$ descriptors corresponding to co-edge chains A and B are identical. However, all other descriptors are different from each other. Hence, if the algorithm only uses the $D_o$ descriptors, then it can show a suggestion (e.g., a brown colored semicircle) only inside the co-edge chain B. But not inside co-edge chains C, D and E.

Now let us consider three more coordinate systems $S_m$, $S_r$ and $S_{rm}$ for the co-vertex at the right-angled corner of A and compute the three descriptors $D_m$, $D_r$ and $D_{rm}$ corresponding to those three coordinate systems.

| Co-edge chain | Descriptor type | $P^{prev}$ | $V_{start}^{prev}$ | $V_{end}^{prev}$ | $V_{end}^{prev2}$ |
|---|---|---|---|---|---|
| A | α part of $D_m$ | 6, 0, 0 | 1, 0, 0 | −1, 0, 0 | −0.6, 0.8, 0 |
| A | α part of $D_r$ | 6, 0, 0 | 1, 0, 0 | −1, 0, 0 | 0.6, 0.8, 0 |
| A | α part of $D_{rm}$ | 0, −6, 0 | 0, 1, 0 | 0, −1, 0 | 0.8, 0.6, 0 |

| Co-edge chain | Descriptor type | $P^{next}$ | $V_{start}^{next}$ | $V_{end}^{next}$ | $V_{start}^{next2}$ |
|---|---|---|---|---|---|
| A | β part of $D_m$ | 0, 8, 0 | 0, −1, 0 | 0, 1, 0 | 0.6, −0.8, 0 |
| A | β part of $D_r$ | 0, −8, 0 | 0, 1, 0 | 0, −1, 0 | −0.6, −0.8, 0 |
| A | β part of $D_{rm}$ | 8, 0, 0 | 1, 0, 0 | −1, 0, 0 | −0.8, −0.6, 0 |

| Co-edge chain | Descriptor type | Descriptor array |
|---|---|---|
| B | Full $D_o$ (α + β) | 0, 6, 0, 0, −1, 0, 0, 1, 0, 0.8, −0.6, 0, 8, 0, 0, 1, 0, 0, −1, 0, 0, −0.8, 0.6, 0 |
| C | Full $D_o$ (α + β) | 0, 8, 0, 0, −1, 0, 0, 1, 0, 0.6, −0.8, 0, 6, 0, 0, 1, 0, 0, −1, 0, 0, −0.6, 0.8, 0 |
| D | Full $D_o$ (α + β) | 0, −8, 0, 0, 1, 0, 0, −1, 0, −0.6, −0.8, 0, 6, 0, 0, 0, 1, 0, 0, −1, 0, 0, 0.6, 0.8, 0 |
| E | Full $D_o$ (α + β) | 0,− 6, 0, 0, 1, 0, 0, −1, 0, 0.8, 0.6, 0, 8, 0, 0, 1, 0, 0, −1, 0, 0, −0.8, −0.6, 0 |
| A | Full $D_o$ (α + β) | 0, 6, 0, 0, −1, 0, 0, 1, 0, 0.8, −0.6, 0, 8, 0, 0, 1, 0, 0, −1, 0, 0, −0.8, 0.6, 0 |
| A | Full $D_m$ (β + α) | 0, 8, 0, 0, −1, 0, 0, 1, 0, 0.6, −0.8, 0, 6, 0, 0, 1, 0, 0, −1, 0, 0, −0.6, 0.8, 0 |
| A | Full $D_r$ (β + α) | 0, −8, 0, 0, 1, 0, 0, −1, 0, −0.6, −0.8, 0, 6, 0, 0, 0, 1, 0, 0, −1, 0, 0, 0.6, 0.8, 0 |
| A | Full $D_{rm}$ (α + β) | 0, −6, 0, 0, 1, 0, 0, −1, 0, 0.8, 0.6, 0, 8, 0, 0, 1, 0, 0, −1, 0, 0, −0.8, −0.6, 0 |

[Note: The +symbol in (α+β) and (β+α) indicates concatenation, not summation].

Figure 12:
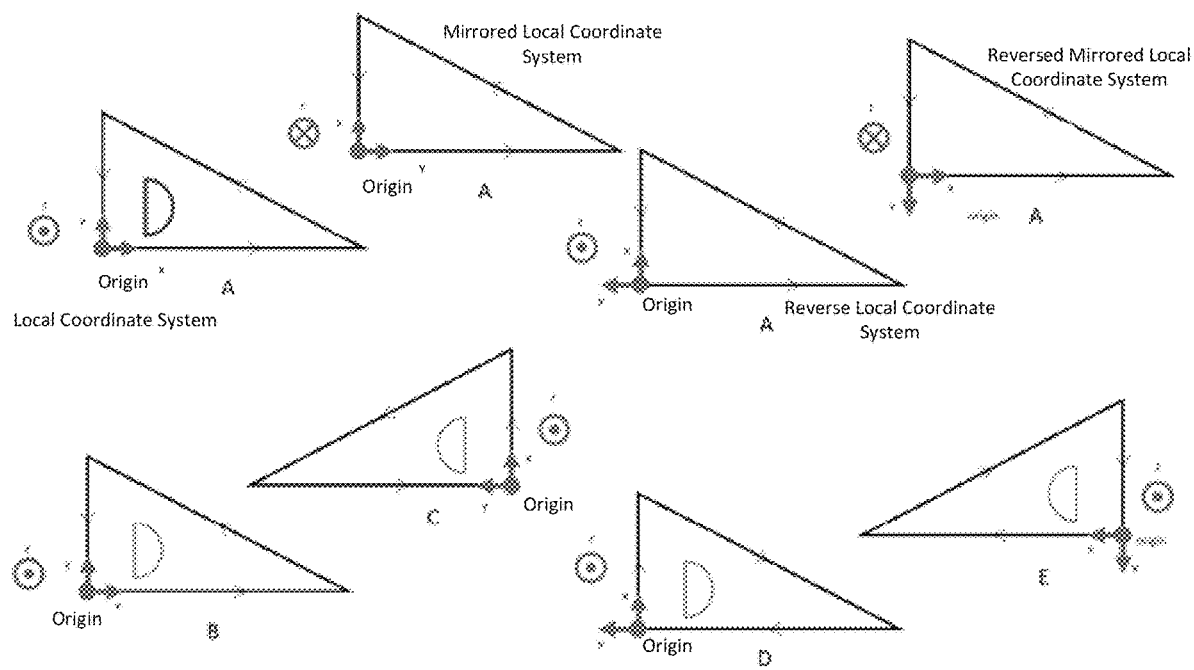

One can now note that:
$D_o$ of B is identical to $D_o$ of A
$D_o$ of C is identical to $D_m$ of A
$D_o$ of D is identical to $D_r$ of A
$D_o$ of E is identical to $D_{rm}$ of A With the introduction of the three additional coordinate systems $S_m$, $S_r$ and $S_{rm}$, the algorithm can now show suggestions (e.g., as brown colored semicircles) inside each of the co-edge chains B, C, D and E (See, e.g., FIG. 12).

A number of embodiments of the invention have been described. Nevertheless, it will be understood that various modifications may be made without departing from the spirit and scope of the invention.

For example, the systems and techniques disclosed herein relate mainly to the field of product design. However, they are applicable in any software application used for 2D or 3D design (e.g., where a user might need or want to reproduce geometries in all similar shaped regions in a modeled object). This may include, for example, software products used for product design, industrial design, sketching, and drawing. Some examples of such apps are SOLIDWORKS, CATIA Part Design, DS 3DByMe, and 3D Sketch App. Such a tool can as well be useful in other software applications that allow creating and editing geometric shapes like MS PowerPoint, Adobe Illustrator, etc.

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification can be implemented as operations performed by a data processing apparatus (e.g., a processor) on data stored on one or more computer-readable storage devices or received from other sources. The term "processor" (or the like) encompasses all kinds of apparatus, devices, and machines for processing data, including by way of example a programmable processor, a computer, a system on a chip, or multiple processors, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them.

The phrase computer may refer to a single discrete computer or multiple discrete computers or computer components coupled together. The phrases processor or computer processor may refer to one discrete processor or more than one discrete processor. In some implementations that include more than one discrete processor, the processors may be distributed across multiple discrete devices and/or locations. The phrases memory or computer memory may refer to one discrete memory device or more than one discrete memory device. In some implementations that include more than one discrete memory device, the memory devices may be distributed across multiple discrete computers or computer components and/or locations.

Other implementations are within the scope of the claims.

What is claimed is:

1. A computer-based method comprising:
    displaying a visual representation of a base geometry as part of a design in a graphics region of a computer-aided design (CAD) software program, wherein the base geometry comprises a co-edge chain comprising a plurality of co-edges connected by co-vertices;
    enabling a user to add a geometric entity to the visual representation of the design;
    designating a first one of the co-vertices in the base geometry as a reference co-vertex;
    calculating a co-vertex descriptor for the reference co-vertex and for each respective one or more other co-vertices in the base geometry, wherein a corresponding one of the co-vertex descriptors for a particular one of the co-vertices comprises an ordered array of numbers in computer memory that represents: 1) properties related to one or more previous co-edges, relative to the particular co-vertex, in the co-edge chain, and 2) properties related to one or more next co-edges, relative to the particular co-vertex, in the co-edge chain;
    predicting a location and orientation in the visual representation of the design for one or more copies of the geometric entity based on a comparison of the calculated co-vertex descriptor for the designated reference co-vertex and the co-vertex descriptor for each respective one of the one or more other co-vertices;
    displaying, as a suggestion to the user, a visual representation of each of the one or more copies of the geometric entity at a corresponding one of the predicted locations and orientations in the visual representation of the design;
    enabling the user to accept at least one of the copies of the geometric entity suggested on the display; and
    updating the design, and the visual representation of the design, to include the at least one copy of the geometric entity, in response to the user's acceptance.

2. The computer-based method of claim 1, further comprising:
    prior to the user accepting the suggestion, displaying user-selectable icons, the selection of which, respectively, enables the user to accept, reject or modify the suggestion.

3. The computer-based method of claim 1, wherein predicting the location and orientation in the design for the copy of the geometric entity comprises:
    designating the geometric entity as a seed geometry;
    identifying a second co-vertex in the design that has a descriptor matching a descriptor of the reference co-vertex; and
    transforming a copy of the seed geometry to a corresponding coordinate system of the second co-vertex.

4. The computer-based method of claim 3, wherein displaying the visual representation of the copy of the geometric entity comprises:
    displaying the copy of the seed geometry that was transformed to the corresponding coordinate system of the second co-vertex.

5. The computer-based method of claim 3, wherein the first one of the co-vertices in the base geometry designated as the reference co-vertex is a selected one of the co-vertices in the base geometry that is physically closest to the geometric entity.

6. The computer-based method of claim 1, wherein predicting the location and orientation in the design for the copy of the geometric entity comprises identifying, for each co-vertex in the design:
    a local coordinate system $S_o$ for the co-vertex;
    a mirrored local coordinate system $S_m$ for the co-vertex;
    a reversed local coordinate system $S_r$ for the co-vertex; and
    a reversed mirrored local coordinate system $S_{rm}$ for the co-vertex.

7. The computer-based method of claim 6, wherein predicting the location and orientation in the design for the copy of the geometric entity further comprises identifying, for each co-vertex in the design:
    a descriptor $D_o$ for the co-vertex expressed in the local coordinate system $S_o$;
    a descriptor $D_m$ for the co-vertex expressed in the mirrored local coordinate system $S_m$;
    a descriptor $D_r$ for the co-vertex expressed in the reversed local coordinate system $S_r$; and
    a descriptor $D_{rm}$ for the co-vertex expressed in the reversed mirrored local coordinate system $S_{rm}$.

8. The computer-based method of claim 7 further comprising, for each co-vertex:
    comparing the co-vertex's descriptor $D_o$ to the reference co-vertex's descriptor $D_o$, the reference co-vertex's descriptor $D_m$, the reference co-vertex's descriptor $D_r$, and the reference co-vertex's descriptor $D_{rm}$ to identify one or more matching co-vertices.

9. The computer-based method of claim 8, further comprising, for each matching co-vertex:
    if the matching co-vertex's descriptor $D_o$ is identical to the reference co-vertex's descriptor $D_o$, transforming a copy of the seed geometry as expressed in the reference co-vertex's $S_o$, to the co-vertex's $S_o$,
    if the matching co-vertex's descriptor $D_o$ is identical to the reference co-vertex's descriptor $D_m$, transforming a copy of the seed geometry as expressed in the reference co-vertex's $S_m$, to the co-vertex's $S_o$,
    if the matching co-vertex's descriptor $D_o$ is identical to the reference co-vertex's descriptor $D_r$, transforming a copy of the seed geometry as expressed in the reference co-vertex's $S_r$, to the matching co-vertex's $S_o$, and
    if the matching co-vertex's descriptor $D_o$ is identical to the reference co-vertex's descriptor $D_{rm}$, transforming a copy of the seed geometry as expressed in the reference co-vertex's local coordinate system $S_{rm}$ to the matching co-vertex's $S_o$.

10. The computer-based method of claim 1, further comprising:
    enabling the user to designate a different co-vertex as the reference co-vertex; and
    changing the suggestion displayed to the user in response to the user designating the different co-vertex as the reference co-vertex.

11. The computer-based method of claim 1, further comprising:

displaying, onscreen, a user-selectable predictive modeling (PM) button in response to the user having added the geometric entity;

wherein displaying the visual representation of the copy of the geometric entity at the predicted location and orientation in the CAD-generated visual representation of the design occurs in response to the user selecting the user-selectable PM button.

12. The computer-based method of claim 11, wherein, prior to the user's acceptance, the visual representation of the copy of the geometric entity at the predicted location and orientation in the CAD-generated visual representation of the design is displayed in a manner that visually distinguishes the visual representation of the copy, which is not yet part of the design, from the added geometric entity, which is part of the design at that point.

13. The computer-based method of claim 1, further comprising:
predicting a location and orientation in the CAD-generated visual representation of the design for each respective one of one or more additional copies of the geometric entity;
displaying, as alternative suggestions to the user, a visual representation of each of the one or more additional copies of the geometric entity along with the visual representation of the copy, wherein each respective visual representation of each of the one or more additional copies of the geometric entity is located and oriented according to an associated one of the predicted locations and orientations in the CAD-generated visual representation of the design;
enabling the user to accept any one or more of the suggested additional copies of the geometric entity in addition to or as an alternative to the suggested copy of the geometric entity; and
updating the design, and the CAD-generated visual representation of the design, to include the copy of the geometric entity, and/or any one or more of the suggested additional copies of the geometric entity in response to the user's acceptance.

14. The computer-based method of claim 1, wherein:
the properties related to the one or more previous co-edges, relative to the particular co-vertex, in the co-edge chain include:
 i. three real numbers that represent x, y and z coordinates of a previous co-vertex in the co-edge chain;
 ii. three real numbers that represent x, y and z components representing a start direction of an immediately previous co-edge in the co-edge chain;
 iii. three real numbers that represent x, y and z components representing an end direction of the immediately previous co-edge in the co-edge chain; and
 iv. three real numbers that represent x, y and z components representing an end direction of a co-edge prior to the immediately previous co-edge in the co-edge chain, and
the properties related to one or more next co-edges, relating to the particular co-vertex, in the co-edge chain include:
 i. three real numbers that represent x, y and z coordinates of a next co-vertex in the co-edge chain;
 ii. three real numbers that represent x, y and z components representing a start direction of an immediately next co-edge in the co-edge chain;
 iii. three real numbers that represent x, y and z components representing an end direction of the immediately next co-edge in the co-edge chain; and
 iv. three real numbers that represent x, y and z components representing a start direction of a co-edge following the immediately next co-edge in the co-edge chain.

15. The computer-based method of claim 14, wherein the properties related to the one or more previous co-edges, relative to the particular co-vertex, in the co-edge chain, and the properties related to one or more next co-edges, relating to the particular co-vertex, in the co-edge chain include are concatenated when being utilized in the comparison of co-vertex descriptors to predict the location and orientation in the visual representation of the design for one or more copies of the geometric entity.

16. A computer comprising:
a computer display;
a computer processor; and
computer-based memory coupled to the computer processor, wherein the computer-based memory stores computer-readable instructions that, when executed by the computer processor, causes the computer processor to:
 display, on the computer display, a visual representation of a base geometry as part of a design in a graphics region of a computer-aided design (CAD) software program, wherein the base geometry comprises a co-edge chain comprising a plurality of co-edges connected by co-vertices;
 enable a user to add a geometric entity to the visual representation of the design;
 designate a first one of the co-vertices in the base geometry as a reference co-vertex:
 calculate a co-vertex descriptor for the reference co-vertex and for each respective one or more other co-vertices in the base geometry, wherein a corresponding one of the co-vertex descriptors for a particular one of the co-vertices comprises an ordered array of numbers in computer memory that represents: 1) properties related to one or more previous co-edges, relative to the particular co-vertex, in the co-edge chain, and 2) properties related to one or more next co-edges, relative to the particular co-vertex, in the co-edge chain;
 predict a location and orientation in the visual representation of the design for one or more copies of the geometric entity based on a comparison of the calculated co-vertex descriptor for the designated reference co-vertex and the co-vertex descriptor for each respective one of the one or more other co-vertices;
 display, on the computer display, as a suggestion to the user, a visual representation of each of the one or more copies of the geometric entity at a corresponding one of the predicted locations and orientations in the visual representation of the design;
 enable the user to accept at least one of the copies of the geometric entity suggested on the display; and
 update the design, and the visual representation of the design, to include the at least one copy of the geometric entity, in response to the user's acceptance.

17. The computer of claim 16, wherein the computer-based memory stores computer-readable instructions that, when executed by the computer processor, further causes the computer processor to:
display, on the computer display, prior to the user accepting the suggestion, user-selectable icons, the selection of which, respectively, enables the user to accept, reject or modify the suggestion.

18. The computer of claim 16, wherein predicting the location and orientation in the design for the copy of the geometric entity comprises:
- designating the geometric entity as a seed geometry;
- identifying a second co-vertex in the design that has a descriptor matching a descriptor of the reference co-vertex; and
- transforming a copy of the seed geometry to a corresponding coordinate system of the second co-vertex.

19. The computer of claim 18, wherein displaying the visual representation of the copy of the geometric entity in the predicted location and orientation comprises:
- displaying, on the computer display, the copy of the seed geometry that was transformed to the corresponding coordinate system of the second co-vertex.

20. The computer of claim 16, wherein predicting the location and orientation in the design for the copy of the geometric entity comprises identifying, for each co-vertex in the design:
- a local coordinate system $S_o$ for the co-vertex;
- a mirrored local coordinate system $S_m$ for the co-vertex;
- a reversed local coordinate system $S_r$ for the co-vertex; and
- a reversed mirrored local coordinate system $S_{rm}$ for the co-vertex.

21. The computer of claim 20, wherein predicting the location and orientation in the design for the copy of the geometric entity further comprises identifying, for each co-vertex in the design:
- a descriptor $D_o$ for the co-vertex expressed in the local coordinate system $S_o$;
- a descriptor $D_m$ for the co-vertex expressed in the mirrored local coordinate system $S_m$;
- a descriptor $D_r$ for the co-vertex expressed in the reversed local coordinate system $S_r$; and
- a descriptor $D_{rm}$ for the co-vertex expressed in the reversed mirrored local coordinate system $S_{rm}$.

22. The computer of claim 21, wherein the computer-based memory stores computer-readable instructions that, when executed by the computer processor, further causes the computer processor to:
- compare, for each co-vertex, the co-vertex's descriptor $D_o$ to the reference co-vertex's descriptor $D_o$, the reference co-vertex's descriptor $D_m$, the reference co-vertex's descriptor $D_r$, and the reference co-vertex's descriptor $D_{rm}$, to identify one or more matching co-vertices.

23. The computer of claim 22, wherein the computer-based memory stores computer-readable instructions that, when executed by the computer processor, further causes the computer processor to, for each matching co-vertex:
- if the matching co-vertex's descriptor $D_o$ is identical to the reference co-vertex's descriptor $D_o$, transform a copy of the seed geometry as expressed in the reference co-vertex's $S_o$ to the co-vertex's $S_o$,
- if the matching co-vertex's descriptor $D_o$ is identical to the reference co-vertex's descriptor $D_m$, transform a copy of the seed geometry as expressed in the reference co-vertex's $S_m$ to the co-vertex's $S_o$,
- if the matching co-vertex's descriptor $D_o$ is identical to the reference co-vertex's descriptor $D_r$, transform a copy of the seed geometry as expressed in the reference co-vertex's $S_r$ to the matching co-vertex's $S_o$, and
- if the matching co-vertex's descriptor $D_o$ is identical to the reference co-vertex's descriptor $D_{rm}$, transform a copy of the seed geometry as expressed in the reference co-vertex's local coordinate system $S_{rm}$ to the matching co-vertex's $S_o$.

24. The computer of claim 16, wherein the computer-based memory stores computer-readable instructions that, when executed by the computer processor, further causes the computer processor to:
- enable the user to designate a different co-vertex as the reference co-vertex; and
- change the suggestion displayed to the user in response to the user designating the different co-vertex as the reference co-vertex.

25. A non-transitory, computer-readable medium that stores instructions executable by a processor to perform the steps comprising:
- displaying, on a computer display, a visual representation of a base geometry as part of a design in a graphics region of a computer-aided design (CAD) software program, wherein the base geometry comprises a co-edge chain comprising a plurality of co-edges connected by co-vertices;
- enabling a user to add a geometric entity to the visual representation of the design;
- designating a first one of the co-vertices in the base geometry as a reference co-vertex;
- calculating a co-vertex descriptor for the reference co-vertex and for each respective one or more other co-vertices in the base geometry, wherein a corresponding one of the co-vertex descriptors for a particular one of the co-vertices comprises an ordered array of numbers in computer memory that represents: 1) properties related to one or more previous co-edges, relative to the particular co-vertex, in the co-edge chain, and 2) properties related to one or more next co-edges, relative to the particular co-vertex, in the co-edge chain;
- predicting a location and orientation in the visual representation of the design for one or more copies of the geometric entity based on a comparison of the calculated co-vertex descriptor for the designated reference co-vertex and the co-vertex descriptor for each respective one of the one or more other co-vertices;
- displaying, on the computer display, as a suggestion to the user, a visual representation of each of the one or more copies of the geometric entity at a corresponding one of the predicted locations and orientations in the visual representation of the design;
- enabling the user to accept at least one of the copies of the geometric entity suggested on the display; and
- updating the design, and the visual representation of the design, to include the at least one copy of the geometric entity, in response to the user's acceptance.

* * * * *